(12) United States Patent
Rashidi

(10) Patent No.: US 6,250,329 B1
(45) Date of Patent: Jun. 26, 2001

(54) SNAP OPEN PRESSURE RELIEF VALVE

(76) Inventor: Ardishir Rashidi, 1408 Forest St., Upland, CA (US) 91784

( * ) Notice: Subject to any disclaimer, the term of this patent is extended or adjusted under 35 U.S.C. 154(b) by 0 days.

(21) Appl. No.: 09/385,312

(22) Filed: Aug. 30, 1999

(51) Int. Cl.$^7$ .................................................. F16K 17/168
(52) U.S. Cl. ............................................ 137/467; 137/536
(58) Field of Search .............................. 137/467, 115.26, 137/115.27, 118.07, 119.05, 536

(56) References Cited

U.S. PATENT DOCUMENTS

| | | | | |
|---|---|---|---|---|
| 2,032,284 | * | 2/1936 | Johnston | 137/115.27 |
| 2,104,700 | * | 1/1938 | Russel | 137/115.27 |
| 2,357,133 | * | 8/1944 | Rider | 137/467 X |
| 3,036,592 | * | 5/1962 | Lips | 137/467 |
| 3,866,629 | * | 2/1975 | Nicklas | 137/885 |
| 4,241,754 | * | 12/1980 | Moen | 137/467 |
| 4,292,990 | * | 10/1981 | Pareja | 137/115.26 |
| 4,725,042 | | 2/1988 | Mason . | |
| 4,781,196 | | 11/1988 | Killion . | |
| 4,799,717 | | 1/1989 | Kingsford . | |
| 4,909,276 | * | 3/1990 | Bayly et al. | 137/467 |
| 4,981,418 | | 1/1991 | Kingsford . | |
| 4,983,104 | | 1/1991 | Kingsford . | |
| 5,161,571 | * | 11/1992 | Nakazawa et al. | 137/496 |
| 5,370,355 | * | 12/1994 | Rembold et al. | 251/64 |

FOREIGN PATENT DOCUMENTS

0009371 * 1/1982 (JP) ...................................... 137/467

OTHER PUBLICATIONS

The Engineering Handbook, By: Key Bellville, Inc., pp. 1 & 2, Aug. 1994.

* cited by examiner

Primary Examiner—John Rivell
Assistant Examiner—Meredith H Schoenfeld
(74) Attorney, Agent, or Firm—John J. Connors; Connors & Assoc.

(57) ABSTRACT

A pressure relief valve opens at a predetermined pressure of fluid flowing into the valve. It includes a body member having a passageway with an inlet and an outlet and a barrier member between the inlet and outlet that prevents fluid from flowing between the inlet and outlet. There is a port along the passageway between the inlet and the outlet, and a moveable sealing element having a closed position where said sealing element is seated in the port and an open position where the sealing element is withdrawn from the port. The port is in fluid communication with the outlet when the sealing element is moved to the open position. A disc spring engages the sealing element. This disc spring has a first position holding the sealing element in the port when the pressure of the fluid is below the predetermined pressure and a second position withdrawing the sealing element from the port when the pressure of the fluid exceeds the predetermined pressure.

16 Claims, 27 Drawing Sheets

TYPE I, CLOSED POSITION
SECTION 5-5

TYPE I, CLOSED POSITION
SECTION 5-5

TYPE I, OPEN POSITION
SECTION 5-5

SECTION 9-9

SECTION 10-10

VIEW A

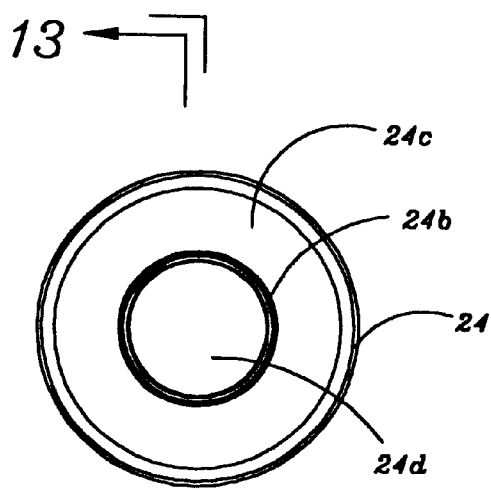
FIG. 12
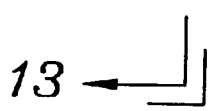
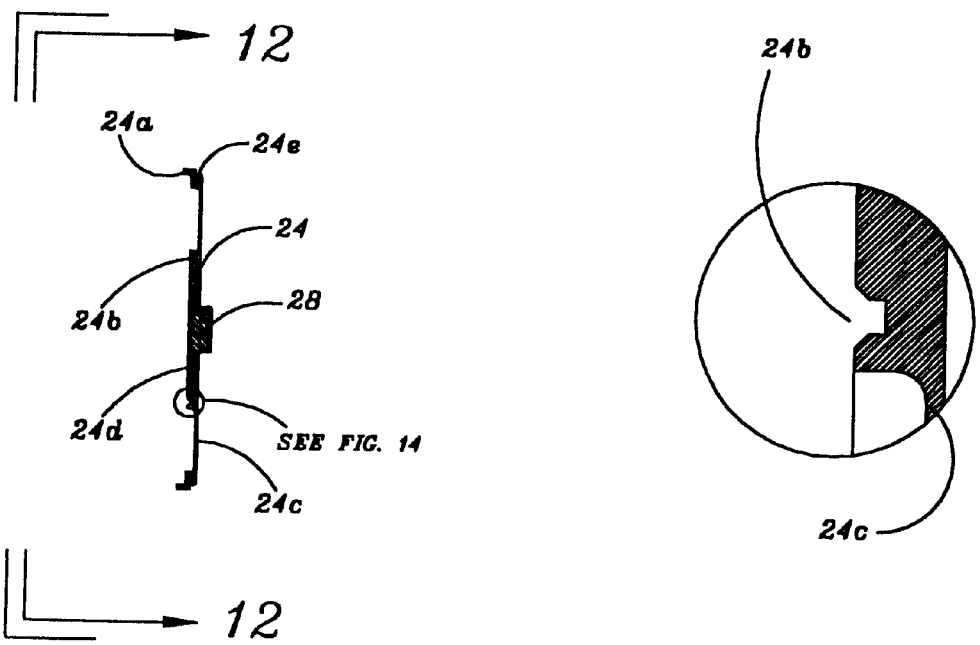
FIG. 13
FIG. 14

VALVE IN CLOSED POSITION

VALVE IN OPEN POSITION

VALVE IN CLOSED POSITION

VALVE IN OPEN POSITION

SNAP OPEN PRESSURE RELIEF VALVE

BACKGROUND OF THE INVENTION

Pressure relief valves are commonly used in the fluid processing industry to control fluid flow, sometimes fluids that are highly corrosive. Typically, such valves are designed to open at a predetermined pressure to direct the fluid through a passageway and reduce the pressure in a container, pipe or other vessel or reservoir that holds the fluid. This avoids excessive pressures building up in the fluid that could cause damage or even an explosion.

SUMMARY OF THE INVENTION

This invention has several features, no single one of which is solely responsible for its desirable attributes. Without limiting the scope of this invention as expressed by the claims that follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include, but are not limited to, resistant to corrosive fluids, and precise control to open and close the valve at a predetermined fluid pressure.

The first feature of the pressure relief valve of this invention is that opens at a predetermined pressure of fluid flowing into the valve. The valve includes a body member having a passageway with an inlet and an outlet and a barrier member between the inlet and outlet that prevents fluid from flowing between said inlet and outlet. The body member has a longitudinal axis and, in one embodiment, the inlet and outlet are along this longitudinal axis. In another embodiment, passageway has a right angle bend therein and the inlet and outlet are at opposite ends of the passageway.

The second feature is that there is a port along the passageway between the inlet and the outlet and a moveable sealing element or plug having a closed position where the plug is seated in the port and an open position where the plug is withdrawn from the port. In one embodiment, the plug includes a ball member that is seated in the port when in the closed position. The ball member has a gap therein that compensates for thermal expansion and contraction without moving the plug between an open or closed position. The port is in fluid communication with the outlet when the plug is moved to the open position. Preferably, the plug and the passageway each have faces that contacts the fluid made of a fluorocarbon polymer. In one embodiment, the barrier member has an upstream side and a downstream side, with a first port in communication with the passageway on the upstream side of the barrier member and a second port in communication with the passageway on the downstream side of the barrier member.

The third feature is a disc spring engaging the plug. The disc spring has a first position holding the plug in the port when the pressure of the fluid is below the predetermined pressure and a second position withdrawing the plug from the port when the pressure of the fluid exceeds the predetermined pressure. The disc spring has a shape that is a segment of a cone.

The fourth, an optional feature, is a reset member that is manually activated to position the disc spring in the first position to insert the plug in the port.

The fifth, an optional feature, is a drain outlet with a manually controllable valve that has an open position allowing fluid to flow out the drain outlet and a closed position preventing fluid from exiting the valve through the drain outlet.

DESCRIPTION OF THE DRAWINGS

The preferred embodiments of this invention, illustrating all its features, will now be discussed in detail. These embodiments depict the novel and non-obvious snap open valve of this invention as shown in the accompanying drawing, which is for illustrative purposes only. This drawing includes the following figures (FIGS.), with like numerals indicating like parts:

FIGS. 2B-1 through 2B-7 are enlarged fragmentary views of the broken away portions and the open top of the body member taken from the encircled sections of FIG. 2B.

FIG. 3$a$ is a perspective view of the disc spring used in this invention in a free or unloaded position.

FIG. 3$b$ is a perspective view of the disc spring used in this invention in an inverted position.

FIG. 3$c$ side view of the disc spring used in this invention in a free or unloaded position.

FIG. 3$d$ side view of the disc spring used in this invention in a partial compression.

FIG. 3$e$ side view of the disc spring used in this invention in partial compression greater than that shown in FIGS. 3$c$ and 3$d$, and is at a substantially flat position and at a limit where the spring is ready to move to an inverted position as shown in FIG. 3$f$.

FIG. 3$f$ side view of the disc spring used in this invention shown in an inverted position.

FIG. 4 is a plan view of the first embodiment of this invention.

FIG. 5 is a cross-sectional view taken along line 5—5 of FIG. 4 showing the valve in the closed position.

FIG. 6 is a cross-sectional view similar to that of FIG. 5 except the valve is in the open position.

FIG. 7 is a plan view of the body member of the valve in FIG. 1.

FIG. 12 is a plan view taken along line 12—12 of FIG. 13 showing the underside of inner diaphragm used in the valve shown in FIG. 1.

FIG. 13 is a cross-sectional view taken along line 13—13 of FIG. 12.

FIG. 14 is an enlarged fragmentary view taken along encircling line 14 of FIG. 12.

DESCRIPTION OF THE PREFERRED EMBODIMENTS

First Embodiment

Figure 8:
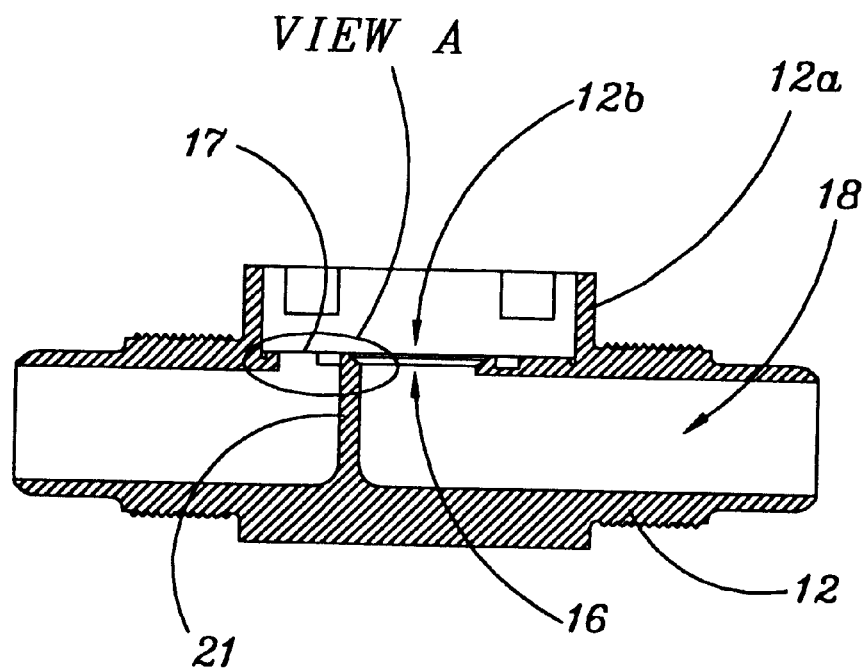
FIG. 8 is a cross-sectional view taken along line 8—8 of FIG. 7.
Figure 9:
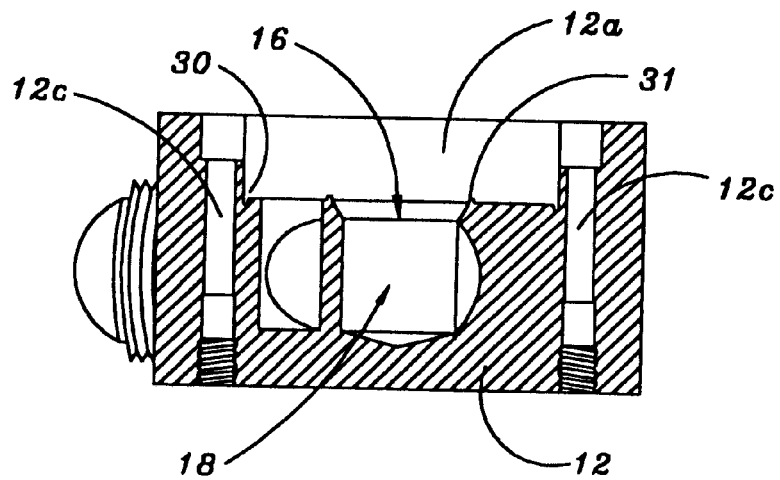
FIG. 9 is a cross-sectional view taken along line 9—9 of FIG. 7.
Figure 10:
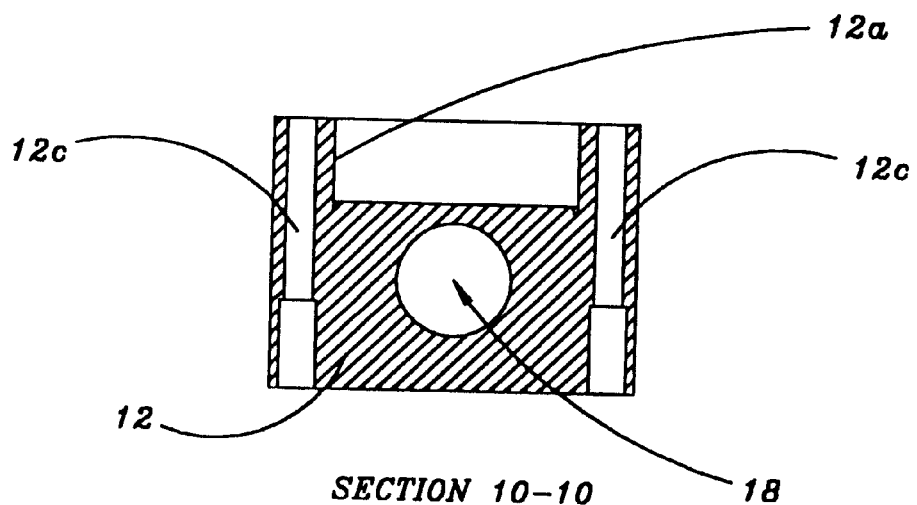
FIG. 10 is a cross-sectional view taken along line 10—10 of FIG. 7.
Figure 11:
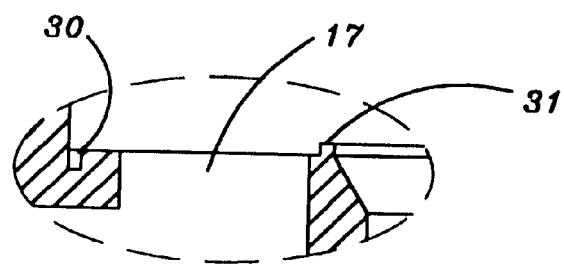
FIG. 11 is an enlarged fragmentary view taken along the encircling line 11 of FIG. 8.

As best shown in FIGS. 1–6, the first embodiment 10 of the snap open relief valve of this invention includes a body member 12 preferably made of a fluorocarbon polymer such as Teflon®, and a plug 14 which fits into a circular shaped port 16 along a passageway 18 (FIGS. 5, 6, 8, and 9) in the body member that extends between an inlet 20 and outlet 22. Through holes 12c in the corners of the body member allow screws 46 to pass through the body member and hold the components of the valve 10 together. As best illustrated in FIG. 8, a circular wall 12a in the upper surface of the body member 12 forms a cavity 12b in the body member. The plug 14 is made up of an inner diaphragm 24 which is made of a fluorocarbon polymer and an outer diaphragm 26. As best illustrated in FIGS. 5, 6, 8 and 11, another circular shaped port 17 is adjacent to the port 16. Because a fluorocarbon polymer is used on the surfaces making contact with the fluid, corrosive fluids will not damage the valve.

Figure 1:
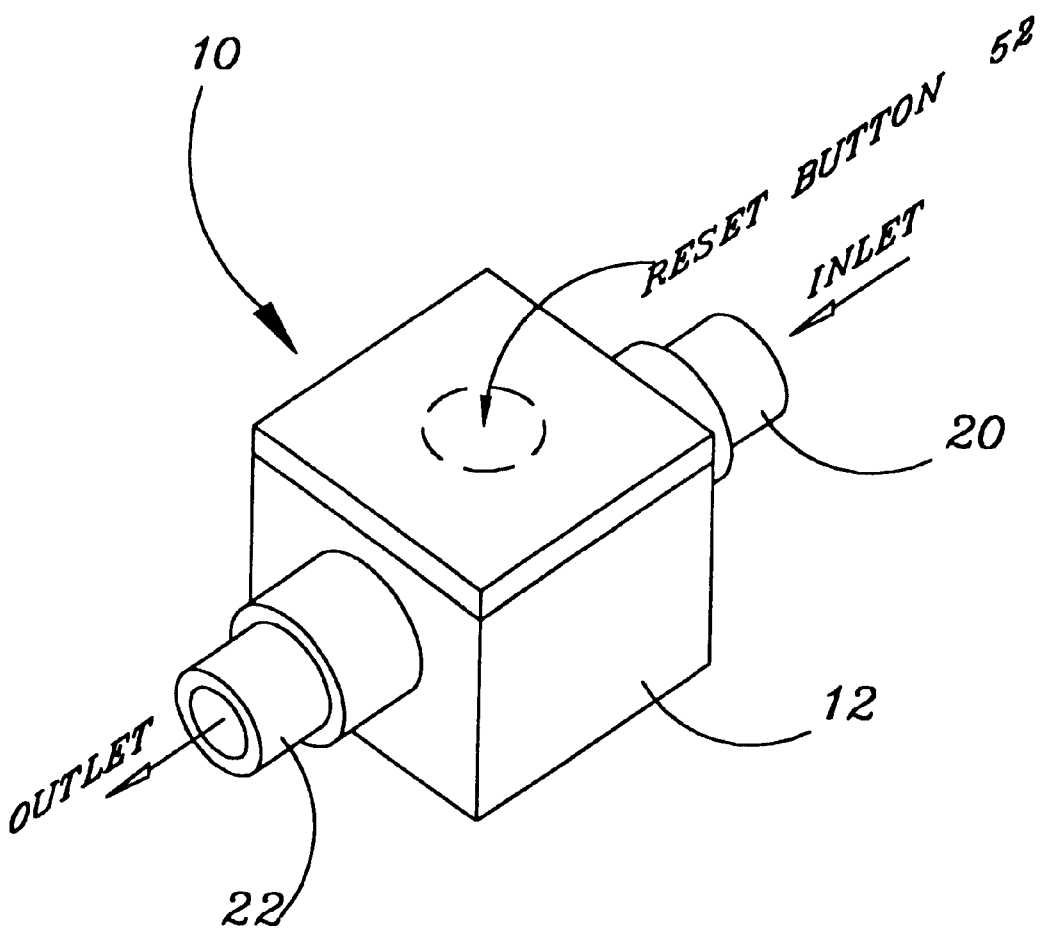
FIG. 1 is a perspective view of the first embodiment of the pressure relief valve of this invention.
Figure 2A:
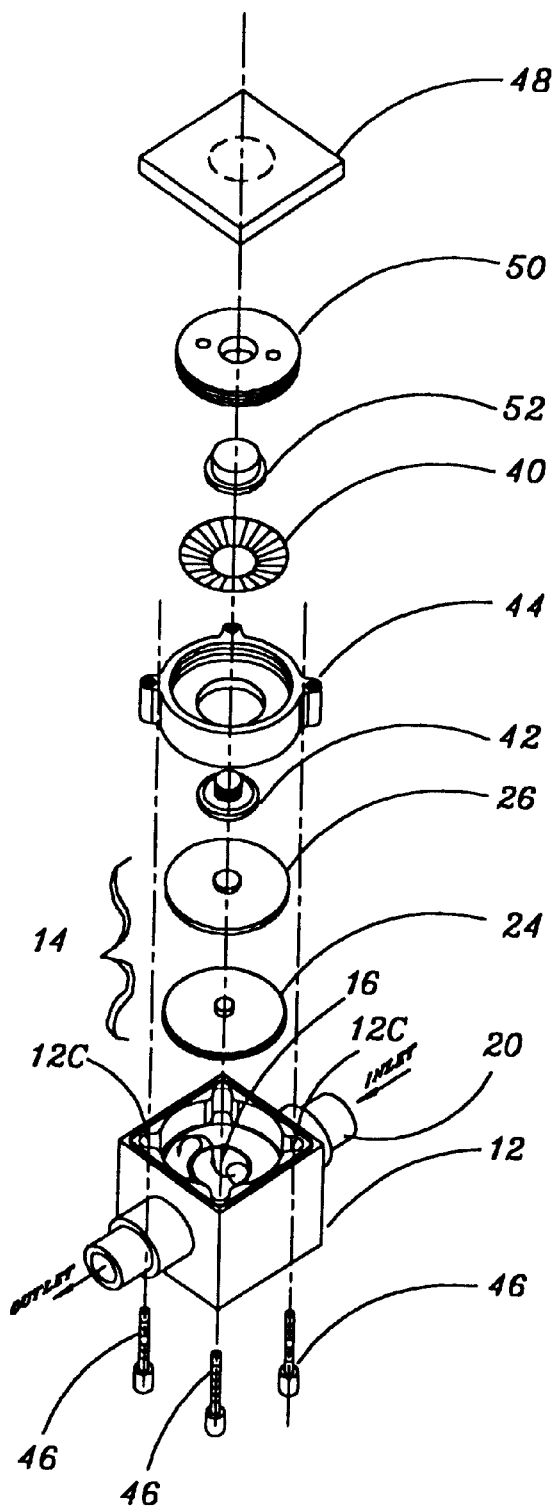
FIG. 2A is an exploded perspective view of the pressure relief valve shown in FIG. 1.
Figure 2B:
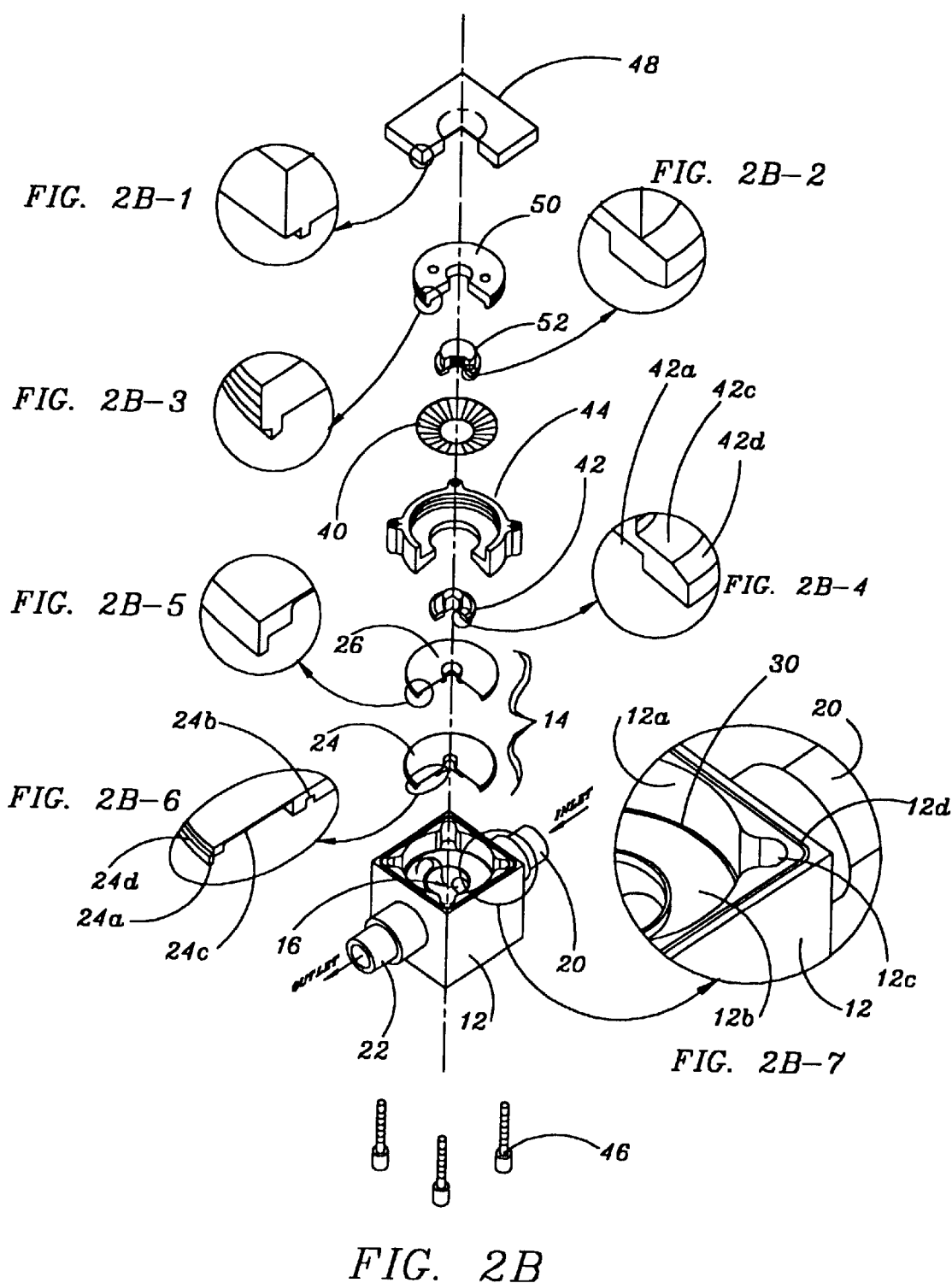
FIG. 2B is an exploded perspective view of the pressure relief valve similar to that shown in FIG. 2A, with portions of some of the components broken away.
Figures 3A, 3B:
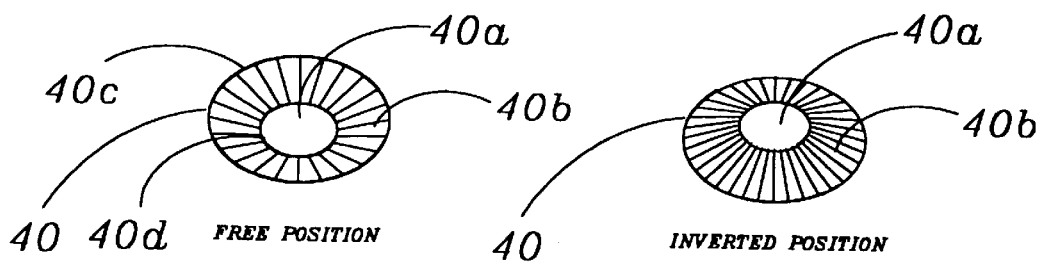
Figures 3C, 3D, 3E, 3F:
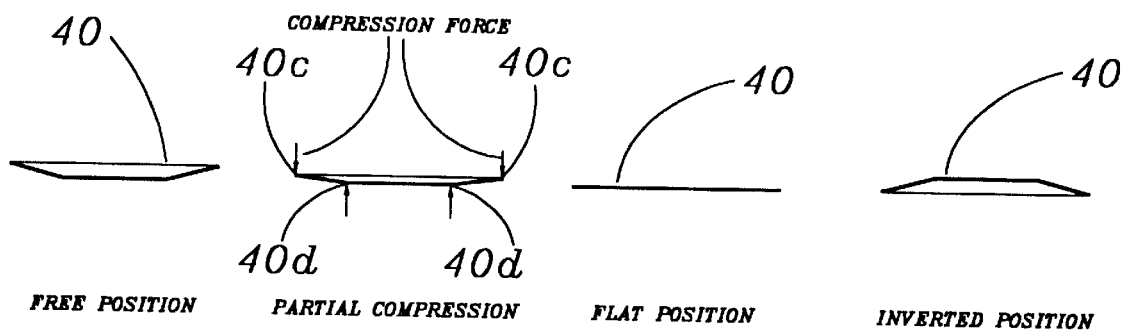
Figure 4:
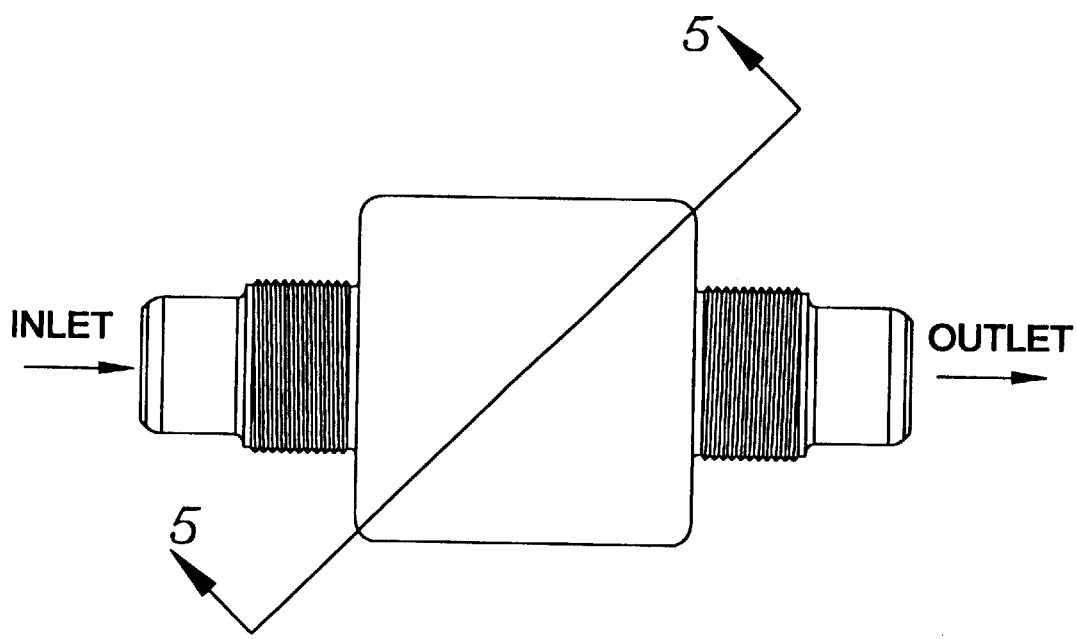
Figure 5:
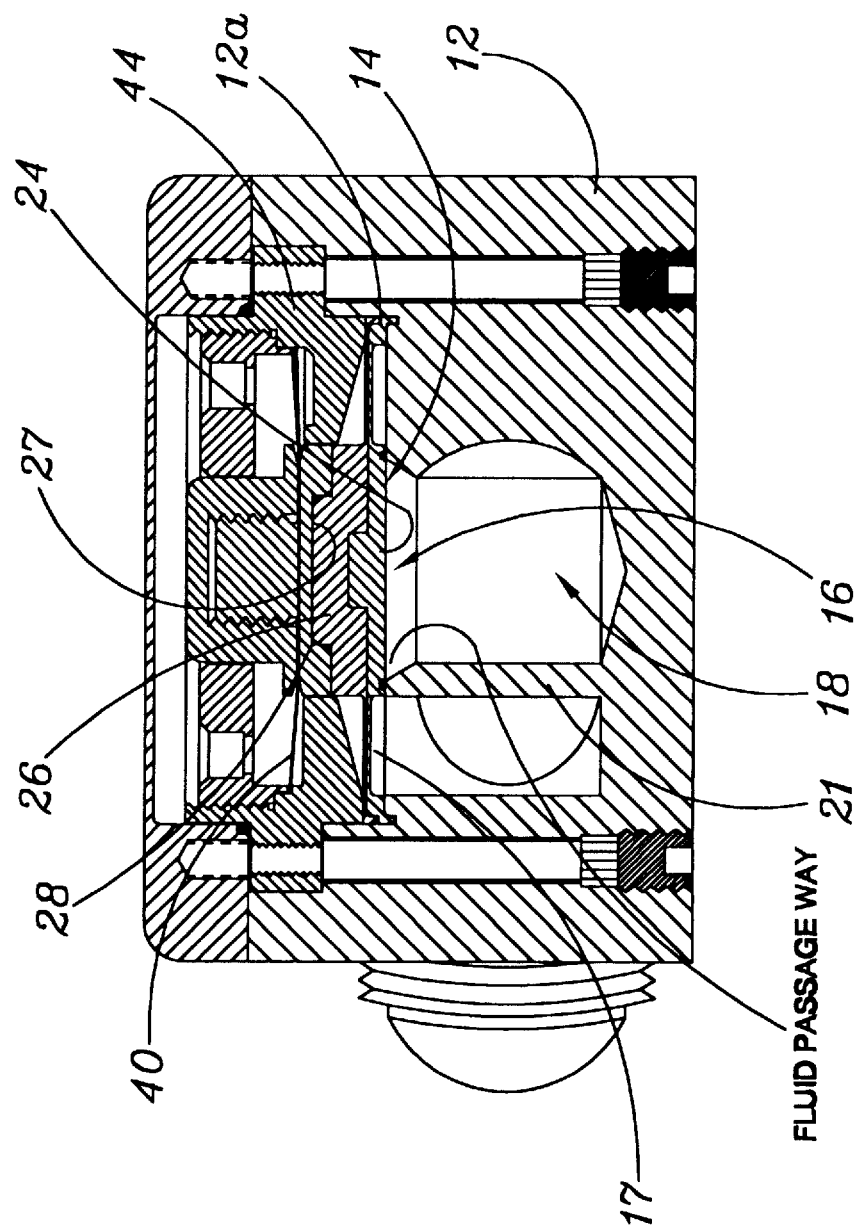

The ports 16 and 17 are enclosed within the cavity 12b and are separated by a barrier wall 21 in the passageway 18 that prevents fluid from flowing directly from the inlet 20 through the passageway 18 and out the outlet 22. As shown in FIG. 5, the plug 14 is positioned within the one port 16 to stop any fluid flow between the inlet 20 and outlet 22. A disc spring 40, having an outer edge 40c and inner edge 40d, that is coupled to the plug 14 controls the position of the plug. At a predetermined fluid pressure, the disc spring 40 inverts, moving from the position shown in FIG. 5 to the position shown in FIG. 6, to cause the plug 14, including both the inner and outer diaphragms 24 and 26, to be withdrawn from the one port 16 to permit the fluid to flow between the inlet 20 and outlet 22.

Figure 6:
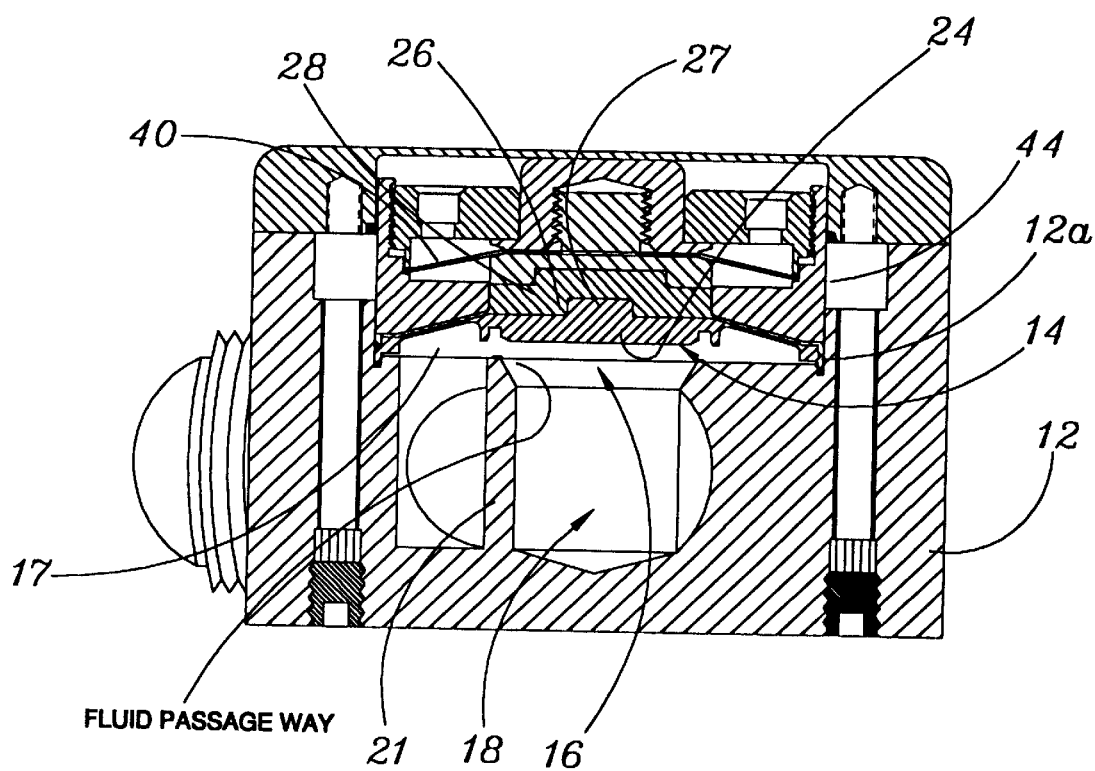
Figure 7:
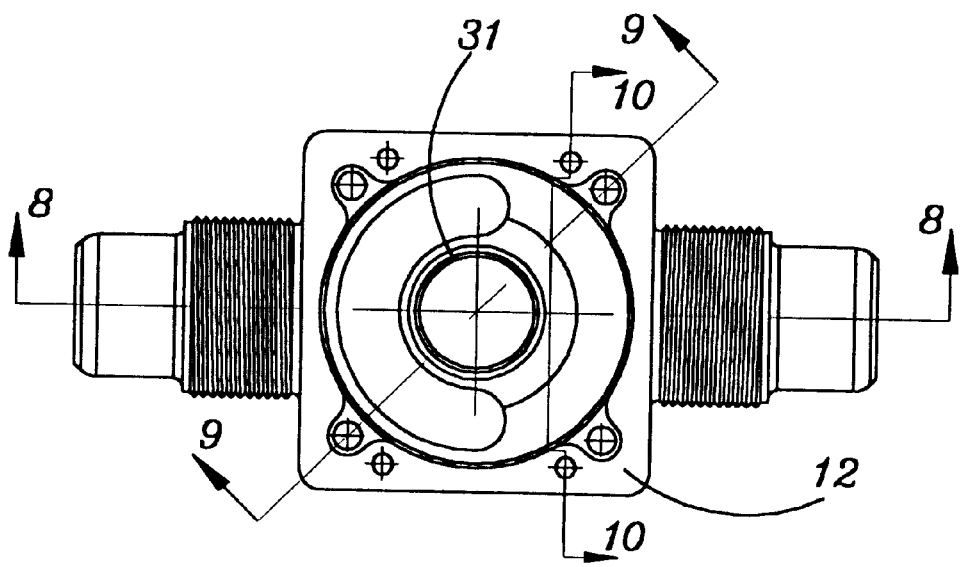

These inner and outer diaphragms 24 and 26 forming the plug are substantially circular in shape and are stacked together, with the outer diaphragm having on its inside surface a central recess 27 into which fits a central, raised element 28 on the outer surface of the inner diaphragm. As best shown in FIGS. 2B-6, and 12 through 14, the inner diaphragm 24 has a relatively thin annular membrane 24c having an outer annular lip 24a, and a thick central portion 24d having therein an inner annular groove 24b. The outer annular lip 24a is force fitted into an annular groove 30 in the upper surface of the body member 12 that encircles both the ports 16 and 17, and the barrier wall 21 in the passageway 18. As best shown in FIG. 7, there is a raised annular member 31 encircling the port 16. This raised annular member 31 partially lies along the top of the barrier wall 21 and it fits into the inner annular groove 24b of the inner diaphragm 24. There is in the outer surface of the inner diaphragm 24 a step 24e.

Figure 15:
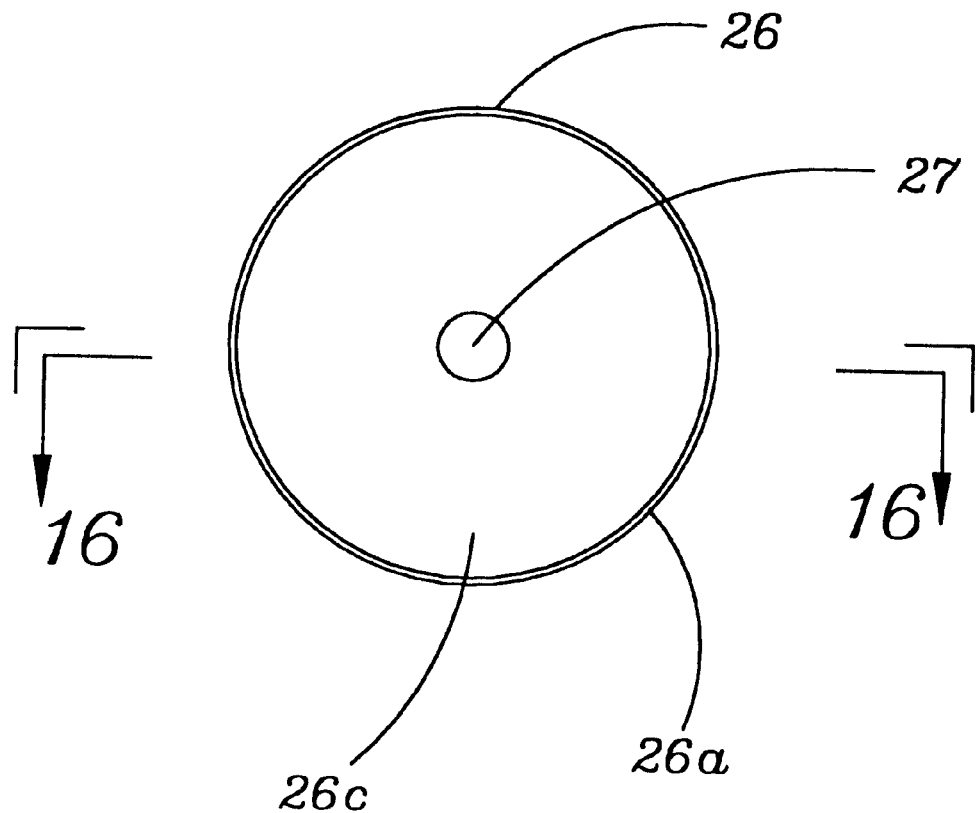
FIG. 15 is a plan view taken along line 15—15 of FIG. 16 showing the underside of the outer diaphragm used in the valve shown in FIG. 1.
Figure 16:
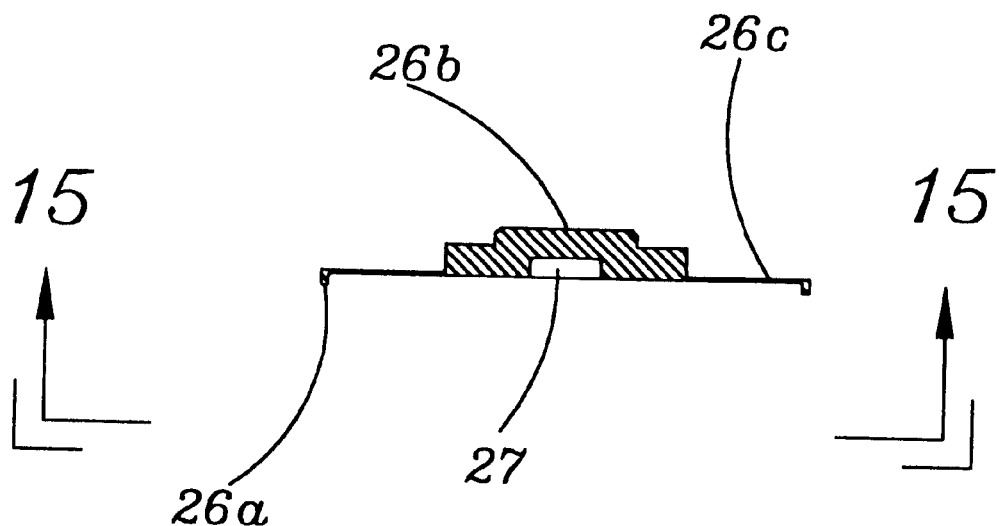
FIG. 16 is a cross-sectional view taken along line 16—16 of FIG. 15.
Figure 19:
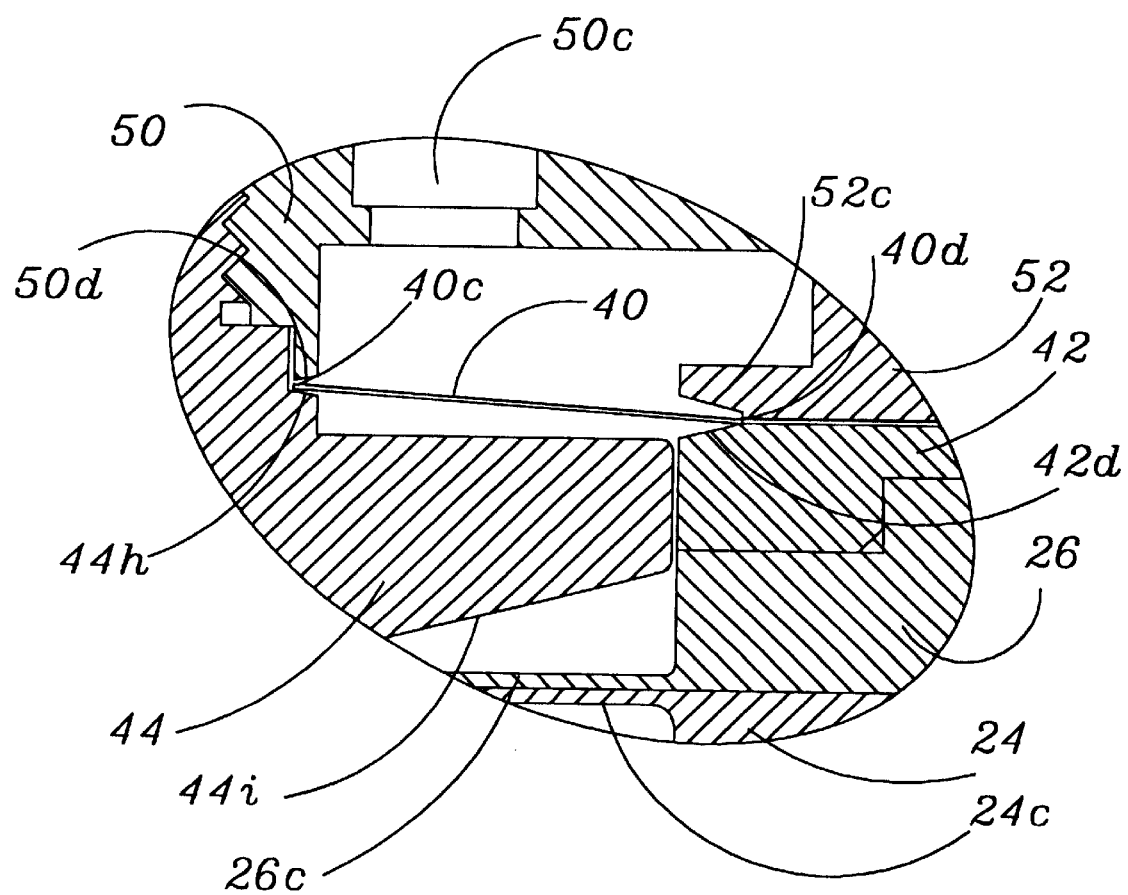
FIG. 19 is an enlarged fragmentary view showing the disc spring positioned between a retainer and a retainer housing.
Figure 20:
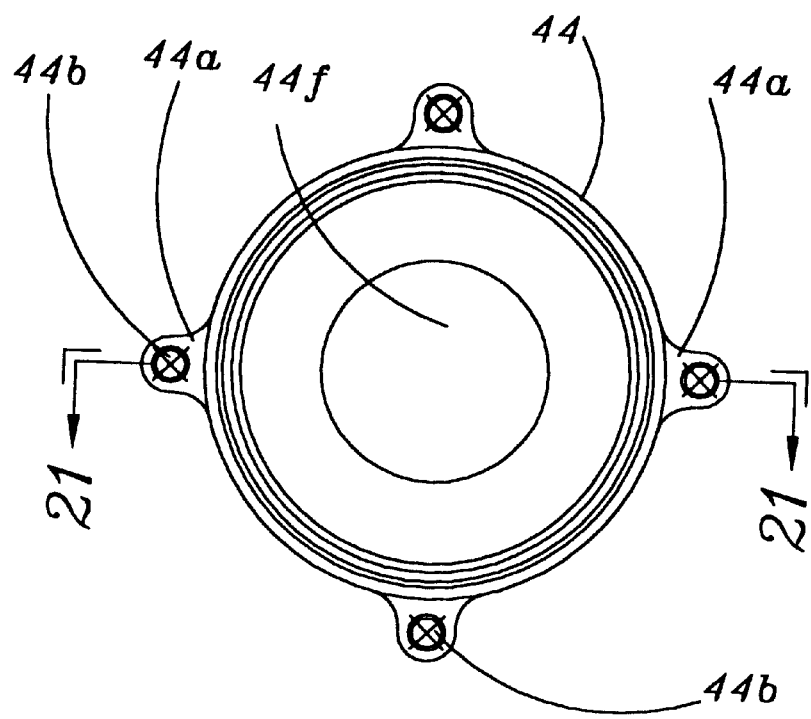
FIG. 20 is plan view taken along line 20—20 of FIG. 21 showing the top side of the retainer housing used in the valve shown in FIG. 1.

As best illustrated in FIGS. 15 and 16, the outer diaphragm 26 comprises a raised central section 26b and a thin peripheral membrane 26c terminating at its outer edge in an annular lip 26a. This annular lip 26a fits into the step 24e in the outer surface of the inner diaphragm 24. Upon assembly of the inner and outer diaphragms 24 and 26, the plug 14 is formed. Because of the thin wall construction of the outer portions of the membranes 24c and 26c, respectively of these diaphragms 24 and 26, these membranes can flex and move to a supported position as shown in FIG. 6. As best shown in FIG. 19, the retainer housing 44 has an inward tapered surface 44i that provides the support for the outer portions 24c and 26c, respectively, of the diaphragms 24 and 26.

Figure 23A:
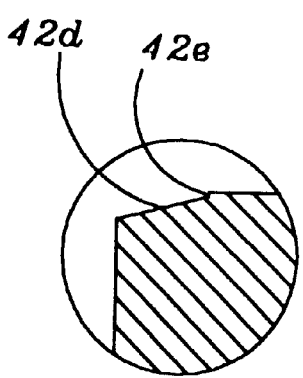
FIG. 23A is a cross-sectional view taken along the encircling line 23A of FIG. 23.
Figure 23:
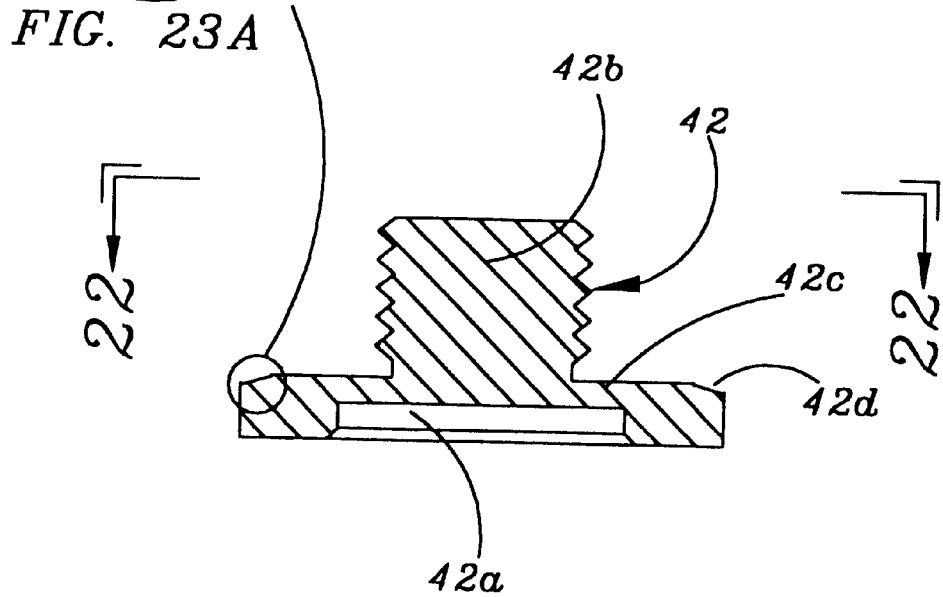
FIG. 23 is a cross-sectional view taken along line 23—23 of FIG. 22.

A sleeve 42 having an inner recess 42a and a central raised threaded member 42b opposite the recess is seated on the assembly of the inner and outer diaphragms with the raised central section 26b of the outer diaphragm fitting within the recess 42a in the sleeve. There is an annular wall 42c surrounding the central raised threaded member 42b and the outer edge 42d of the wall is tapered outward from a step 42e as shown in FIG. 23A.

Figure 17:
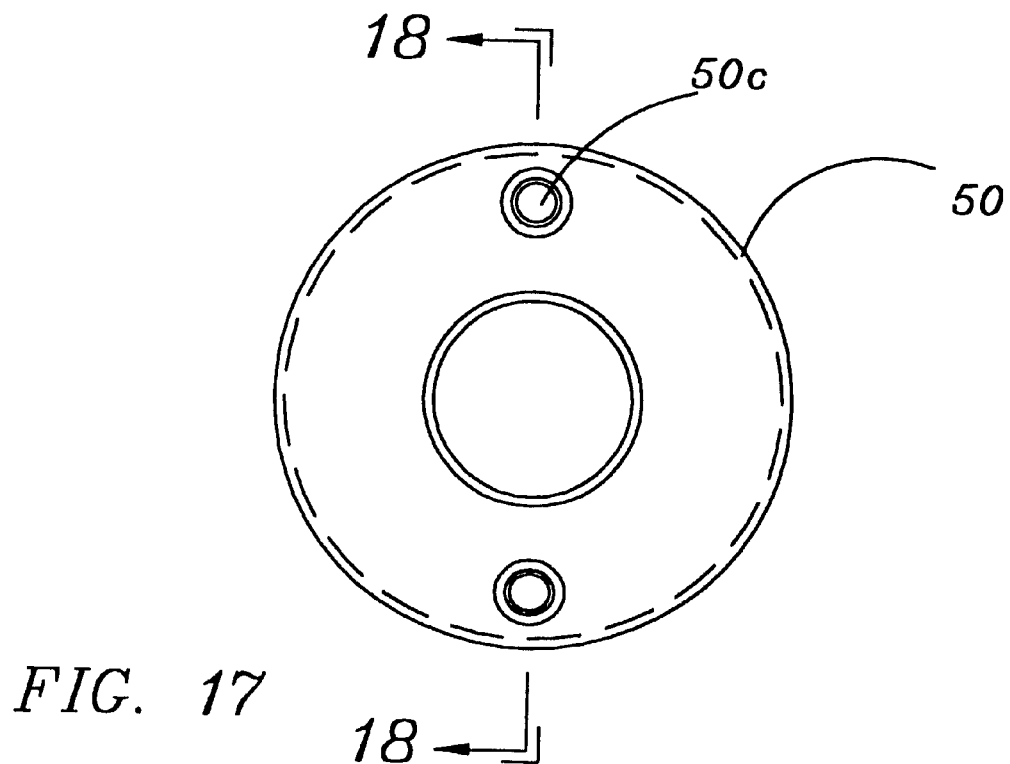
FIG. 17 is a plan view taken along line 17—17 of FIG. 18 showing the top side of the retainer used in the valve shown in FIG. 1.
Figure 18:
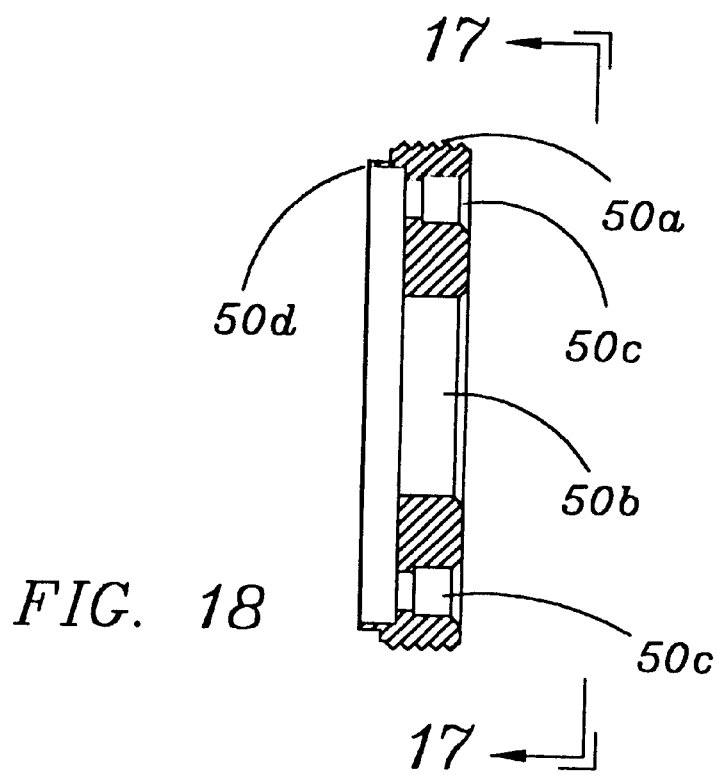
FIG. 18 is a cross-sectional view taken along line 18—18 of FIG. 17.
Figure 21A:
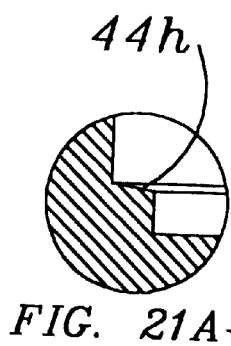
FIG. 21A is a cross-sectional view taken along the encircling line 21A of FIG. 21.
Figure 21:
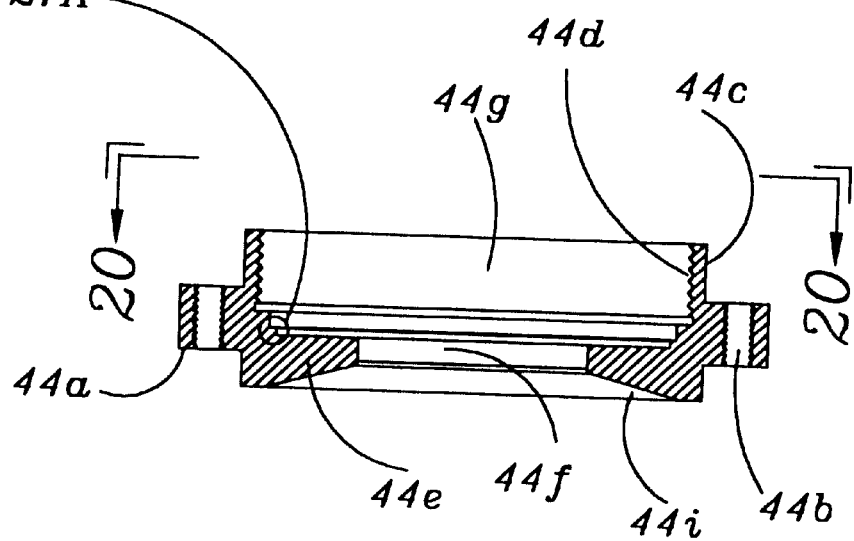
FIG. 21 is a cross-sectional view taken along the line 21—21 of FIG. 20.
Figure 22:
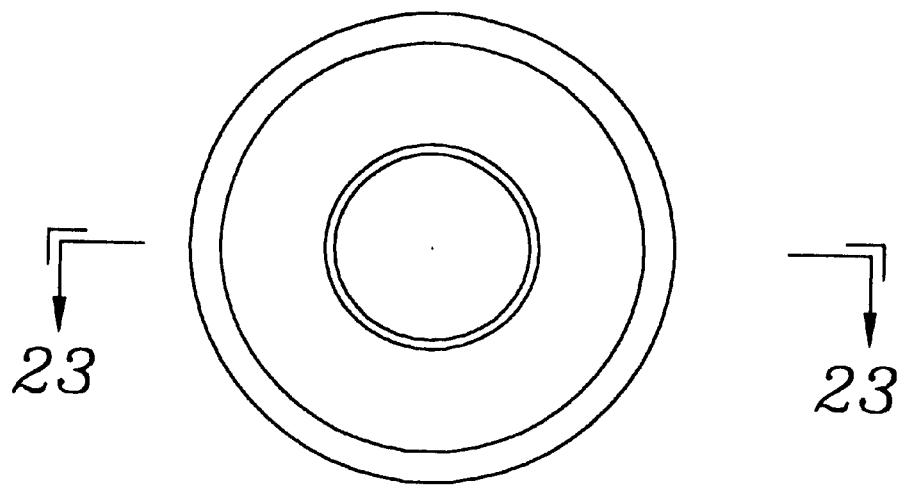
FIG. 22 is a plan view taken along line 22—22 of FIG. 23 showing the top side of the sleeve used in the valve shown in FIG. 1.
Figure 24:
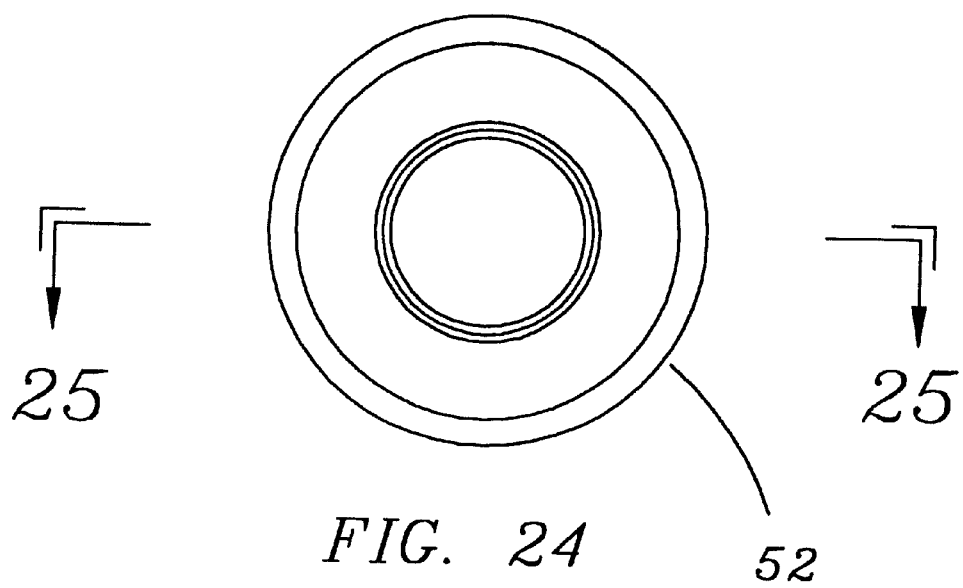
FIG. 24 is a plan view taken along line 24—24 of FIG. 25 showing the top side of the reset button used in the valve shown in FIG. 1.
Figure 25A:
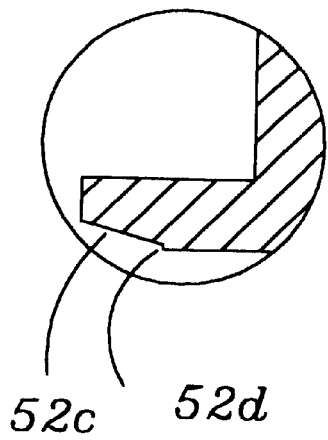
FIG. 25A is a cross-sectional view of taken along the encircling line 25A of FIG. 25.
Figure 25:
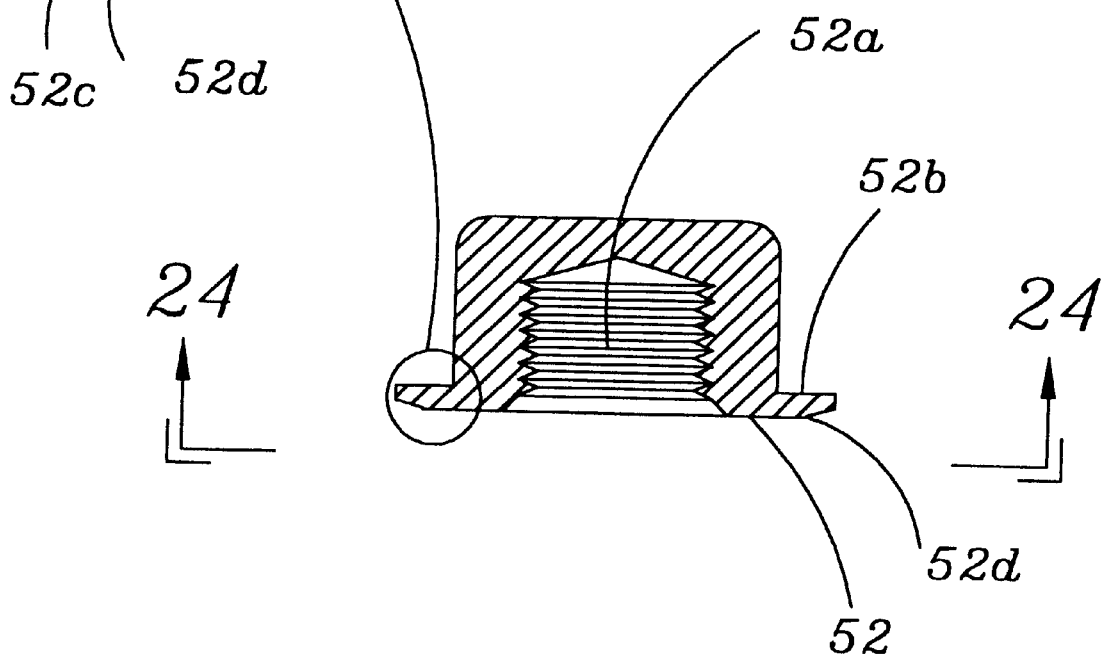
Figures 26, 27:
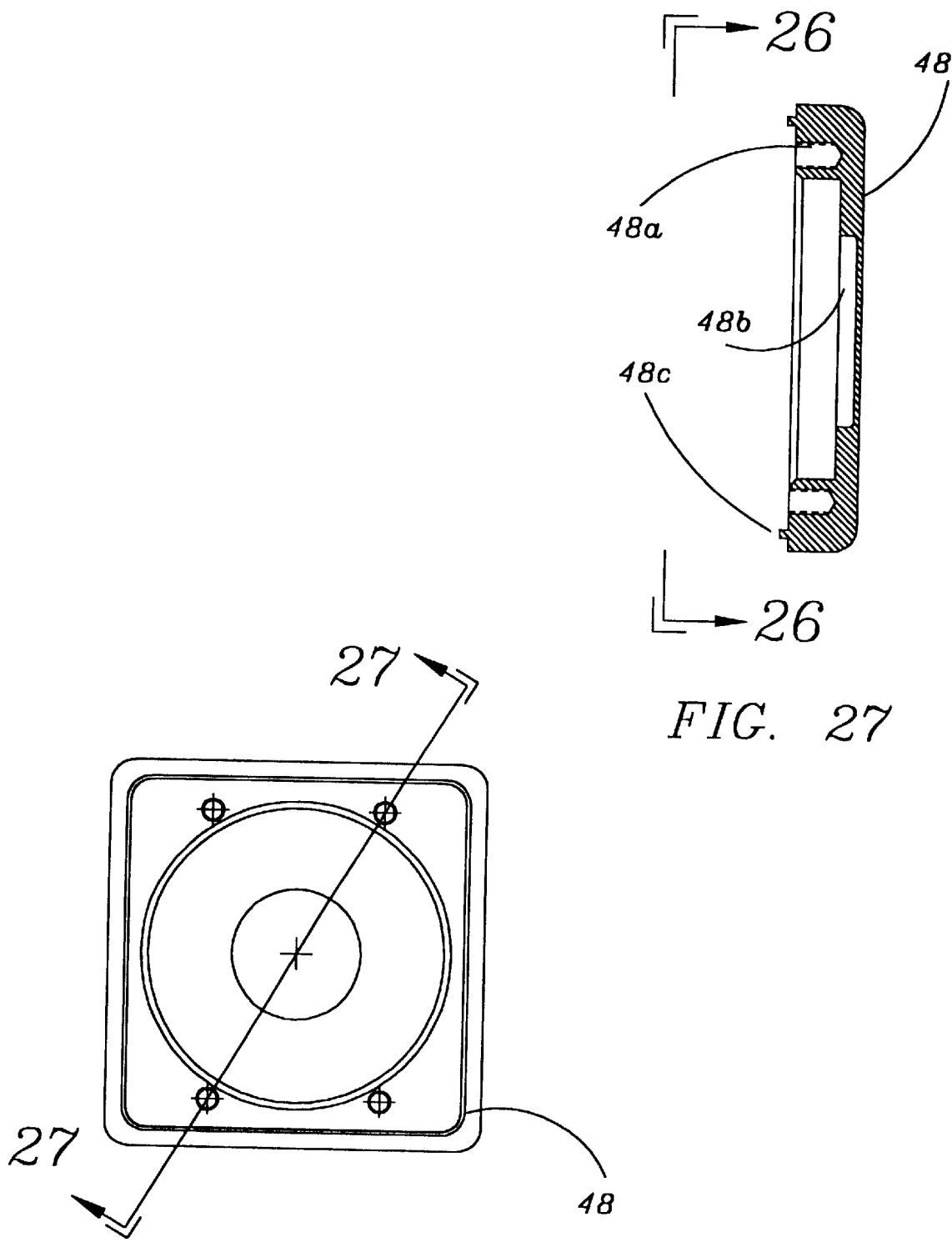
FIG. 26 is a plan view taken along line 26—26 of FIG. 27 showing the underside of the cover used in the valve shown in FIG. 1.
FIG. 27 is a cross-sectional view taken along line 27—27 of FIG. 26.
Figure 28:
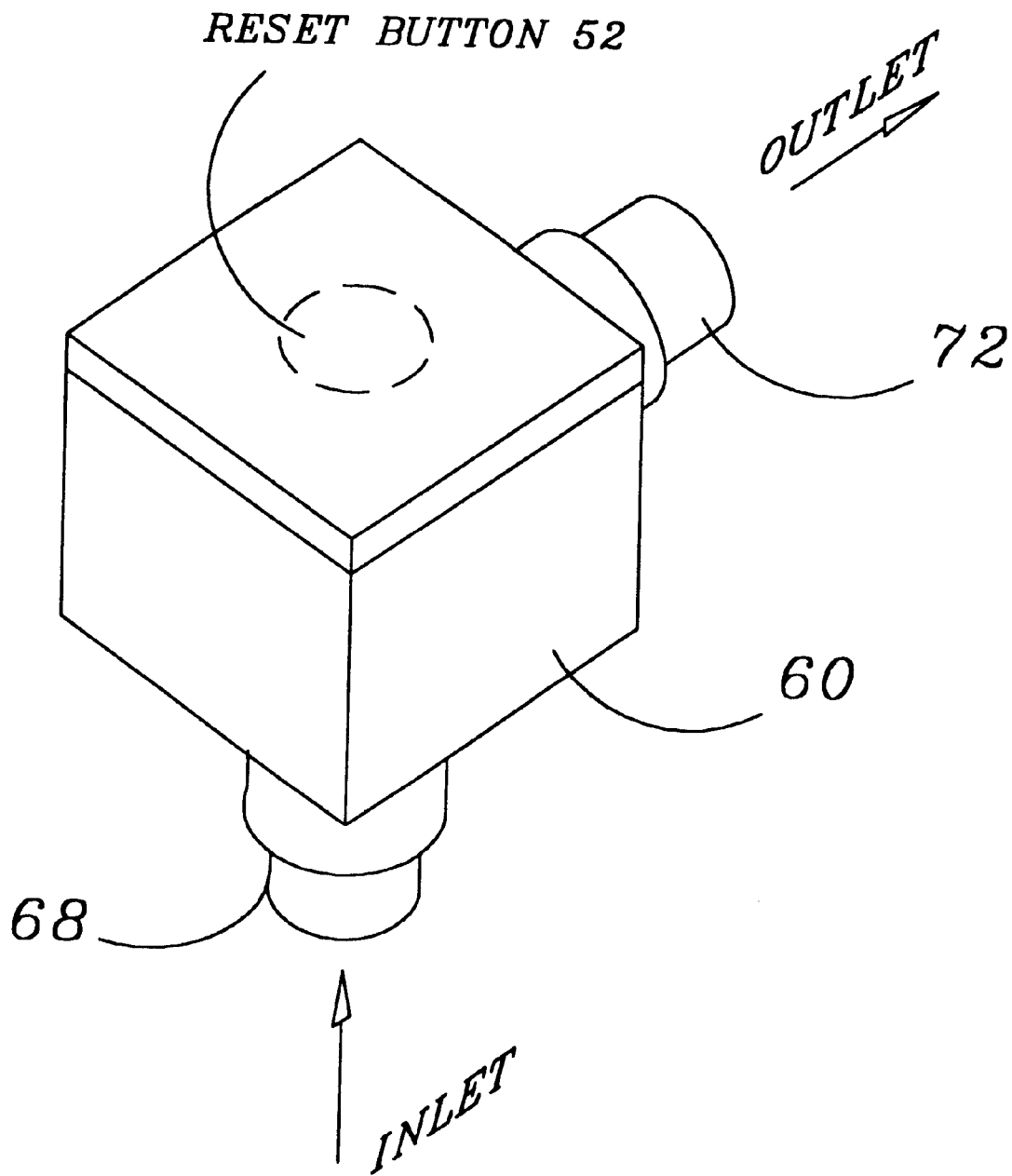
FIG. 28 is a perspective view of the second embodiment of the relief valve of this invention.
Figure 29:
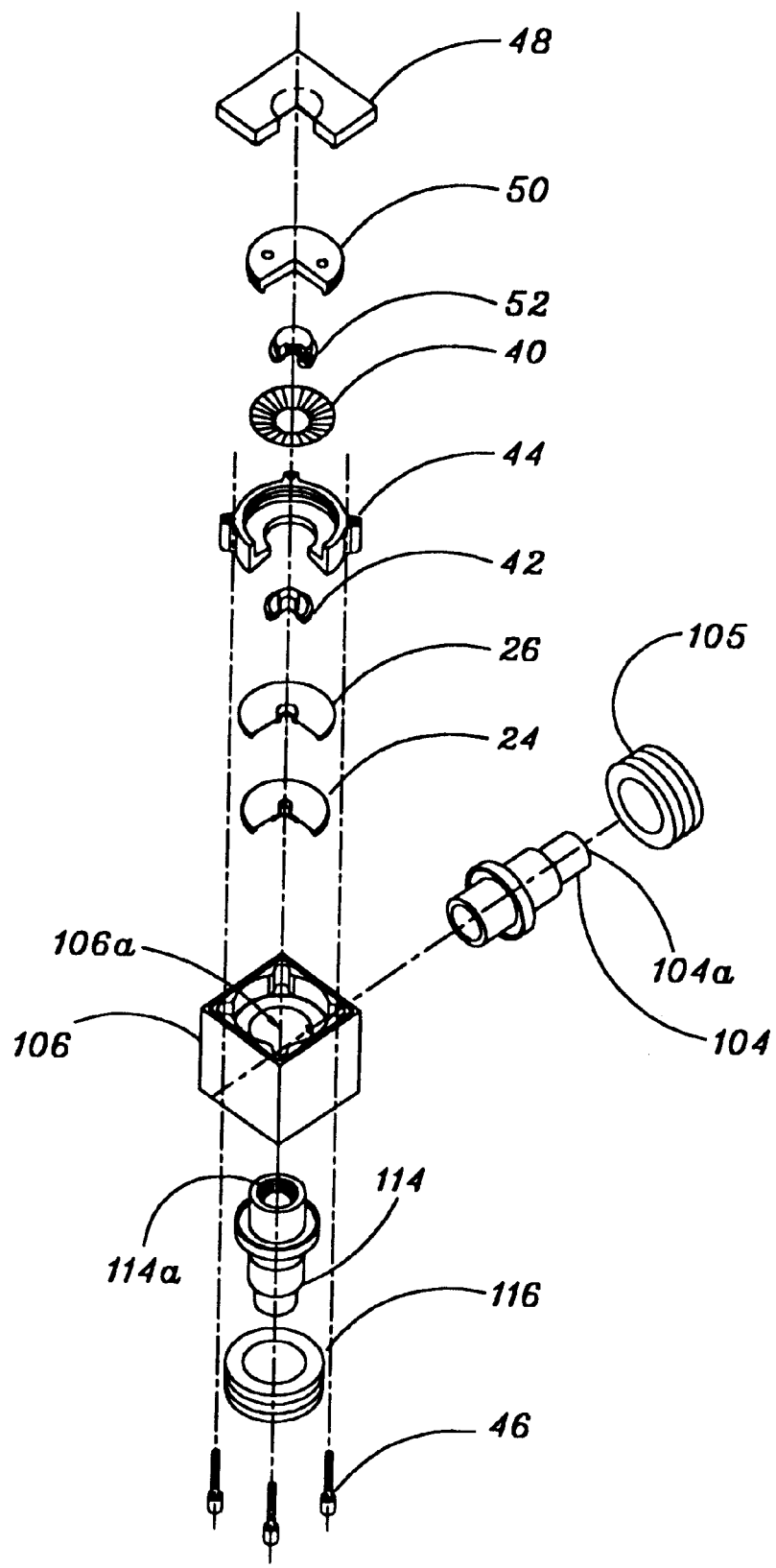
FIG. 29 is an exploded perspective view of the relief valve shown in FIG. 28.
Figure 30:
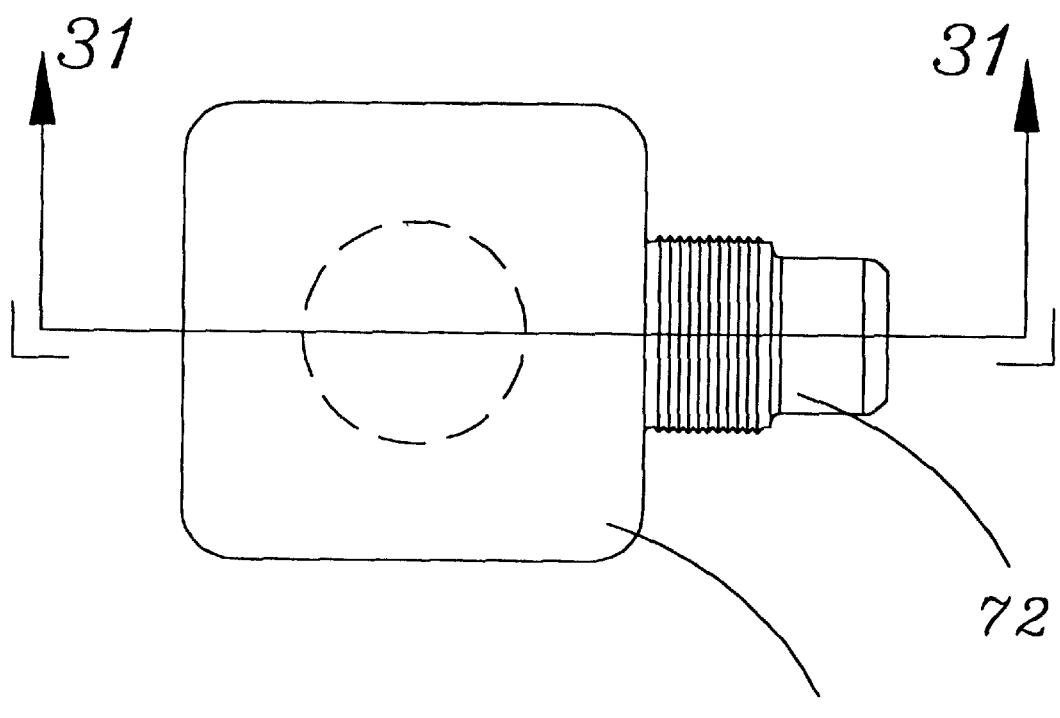
FIG. 30 is a plan view of the relief valve shown in FIG. 28.

The assembly of the diaphragms 24 and 26, and the sleeve 42 are contained in a retainer housing 44 along with the disc spring 40, a button 52, and a retainer 50. The retainer housing 44 has a circular shape with tabs 44a having threaded holes 44b therein for screws 46 that hold the components together. There is a circular wall 44c having internal threads 44d and a bottom wall 44e with a central opening 44f therein. These walls form a cavity 44g into which a retainer 50 is screwed into position upon assembly of the components. Along the intersection of the walls 44c and 44e is a taper ledge 44 (FIG. 21). The retainer housing 44 is positioned snugly within the cavity 12b in the body member, abutting the wall 12a, and it is fastened in position by the screws 46 upon assembly of the inner and outer diaphragms 24 and 26, the disc spring 40, the sleeve 42, the retainer housing 44, the retainer 50, and the button 52. A cover 48 made of Teflon is subsequently attached by inserting a rectangular lip 48c into a corresponding rectangular groove 12d (FIGS. 2B-7) in the body member 12. This creates a hermetically seal of the internal assembled components to prevent rust. Consequently, all the exterior surfaces and all the internal surfaces contacting the fluid are made of Teflon. As best shown in FIGS. 24 and 25, the button 52 has a threaded internal recess 52a surrounded by a flange 52b. The central raised threaded member 42b of the sleeve 42 is screwed into the recess 52a. As best shown in FIGS. 17 and 18, the retainer 50 has on its external wall threads 50a and a central wall 50e through which a center opening 50b extends. The retainer 50 has holes 50c allowing the use of a spanner wrench to turn the retainer 50, so that it may be threaded into the retainer housing 44 with the tapered lip 50d engaging with the outer edge 40c of spring 40.

In accordance with this invention, the disc spring 40 is used to open and close the valve 10 by moving the plug 14 from a position where it is inserted into the port 16 (FIG. 5) and withdrawn from this port (FIG. 6). This disc spring 40 is a conventional device commonly referred to as a Belleville washer. It has a shape as shown in FIGS. 3a through 3f that varies with pressure applied to its inner and outer edges 40c and 40d. Depending on the thickness and inner and outer diameter of the disc spring 40, it will invert at a predetermined applied pressure. This disc spring 40 is placed over the step 42e in sleeve 42 so that the central raised threaded member 42b extends through the central opening 40a of the disc spring. As illustrated best in FIG. 19, the peripheral edge 40c of the disc spring 40 is confined between the tapered lip 50d of the retainer 50 and the tapered ledge 44h of the retainer housing 44. As shown in FIG. 19, the button 52 is screwed on the central raised threaded member 42b of the sleeve 42 and the retainer 50 is screwed into position so that the inner edge 40d of the disc spring 40 is confined between the tapered portion 52c of the button 52 and the tapered portion 42d of the sleeve 42. Consequently, the outer edge 40c of the spring 40 is in a substantially fixed position, and the inner edge 40d moves in unison with the movement of the assembly of the diaphragms 24 and 26, sleeve 42, and button 52. The central opening 44f serves to guide the movement of the assembly of the diaphragms 24 and 26, sleeve 42, and button 52.

The inner and outer diaphragms 24 and 26 forming the plug 14 are forced into the one port 16 and the disc spring 40 maintains the plug in position as shown in FIG. 5 so long as the pressure does not exceed a predetermined limit. When the pressure of the fluid exerted against the plug 14 exceeds this predetermined pressure, the disc spring 40 snaps into an inverted position as shown in FIG. 6 to move the plug 14 away from the port 16, withdrawing it, so that fluid may now flow from the one port 16 into the second port 17 and out the outlet 22.

As shown in FIG. 6, when the valve 10 is opened, the top of the button 52 engages the underside of the cover 48 and fits into a recess 48b in the underside of the cover. This cover 48 is flexible, and when its central exterior surface area opposite the recess 48b is depressed manually, the button 52 is pushed inward, causing the disc spring 40 to again invert and return to its position shown in FIG. 5, with the plug 14 closing the port 16.

Second Embodiment

The second embodiment of this invention, the valve 60 is shown in FIGS. 28 through 32. It is similar to the first embodiment except there is only one port 64 in a passageway 62 extending through a body member 66 made of Teflon®. The passageway 62 is formed by a tubular inlet 68 attached by a lock nut 70 to the underside 66a of the body member 66 and a tubular outlet 72 attached to a side 66b of the body member and held in position by a lock nut 74. The inner ends 68a and 72a, respectively of the tubular inlet 68 and the tubular outlet 72, terminate in an internal cavity 76 within the body member 66. The open inner end 68a of the tubular inlet 68 forms the port 64.

Figure 31:
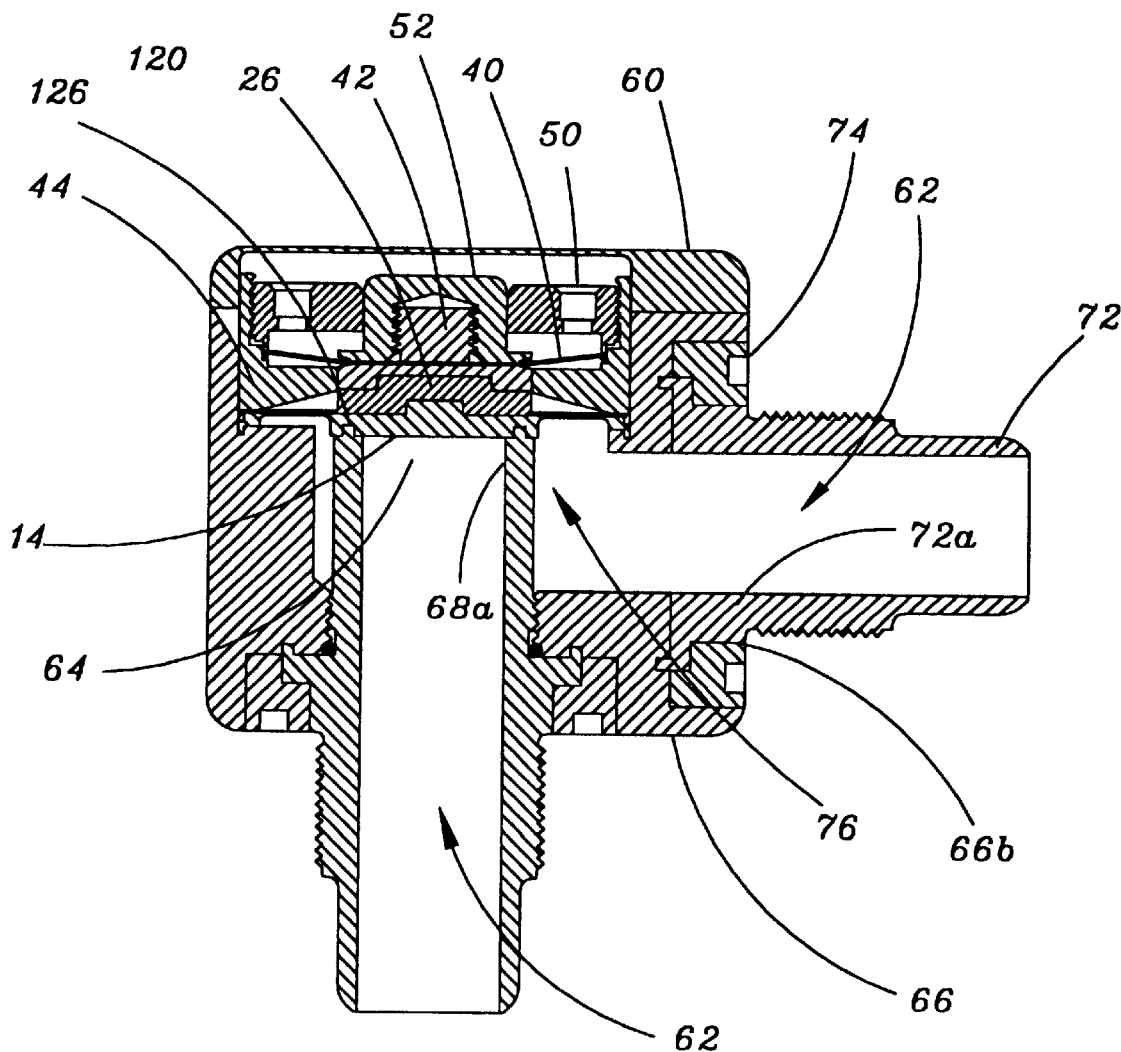
FIG. 31 is a cross-sectional view taken along line 31—31 of FIG. 30 showing the valve in a closed position.

A plug member 14 similar to that employed in the first embodiment closes the port 64 when the valve 60 is in the closed position as shown in FIG. 31. This plug 14 is an assembly of an inner diaphragm 24 and an outer diaphragm 26, and it is seated in the port 64 formed at the inner end 68a of the tubular inlet 68. A retainer housing 44 is seated above the plug 14 and a retainer 50 for a disc spring 40 is screwed onto the raised central section 26b of the outer diaphragm 26. Like the first embodiment, the disc spring 40 fits into the retainer housing 44 and has its outer peripheral edge 40c confined between the tapered lip 50d of the retainer 50 and the tapered ledge 44h of the retainer housing 44, as illustrated in FIG. 19. Also like the first embodiment, a push button 52 is screwed onto the central raised threaded member 42b of a sleeve 42 and a cover 48 is fastened in position. Again like the first embodiment, the cover 48 has a flexible central portion 48b that is manually depressed when the user applies pressure to it to reset the push button 52.

Figure 32:
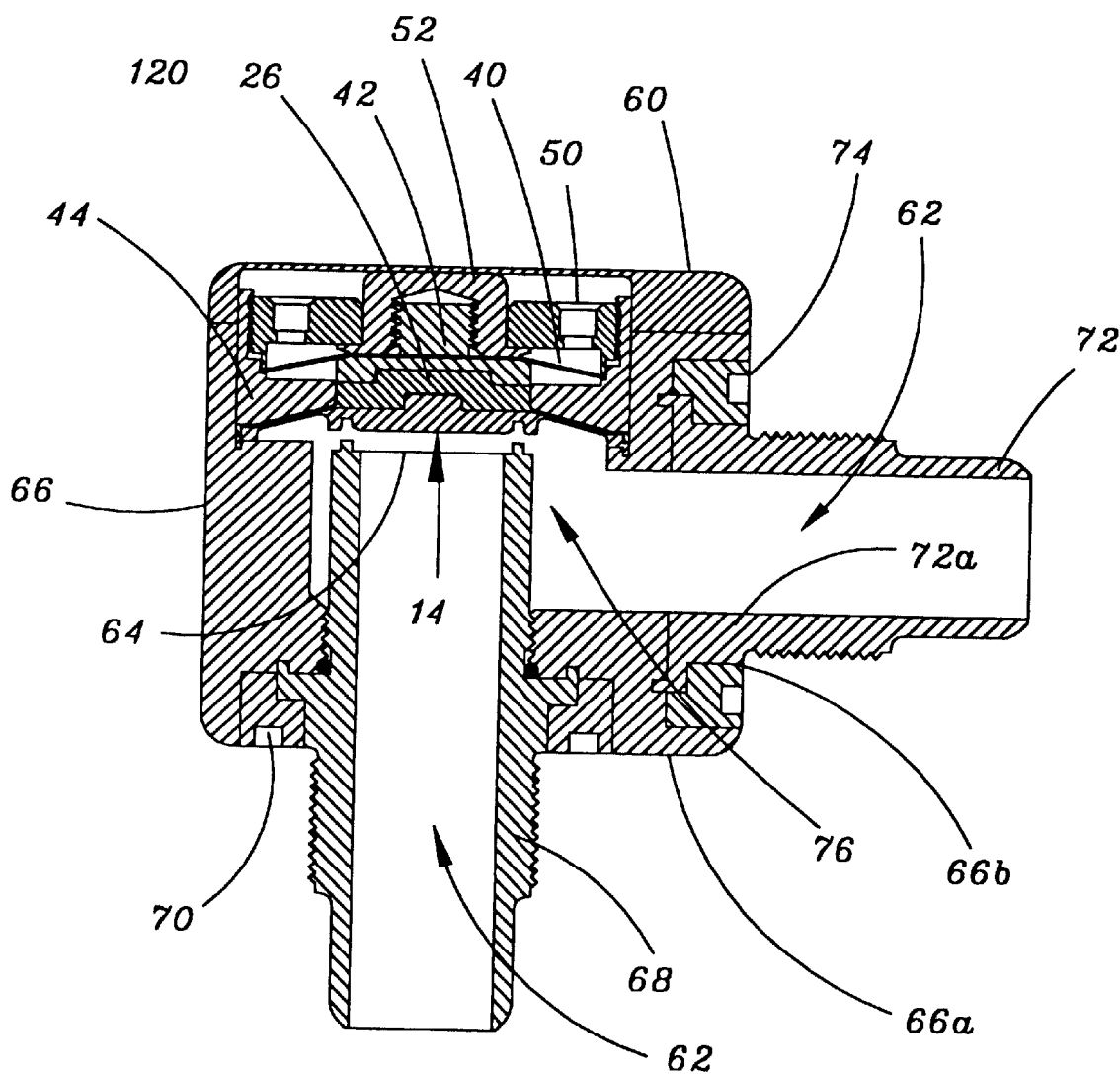
FIG. 32 is a cross-sectional view similar to that shown in FIG. 31 with the valve in the open position.
Figure 33:
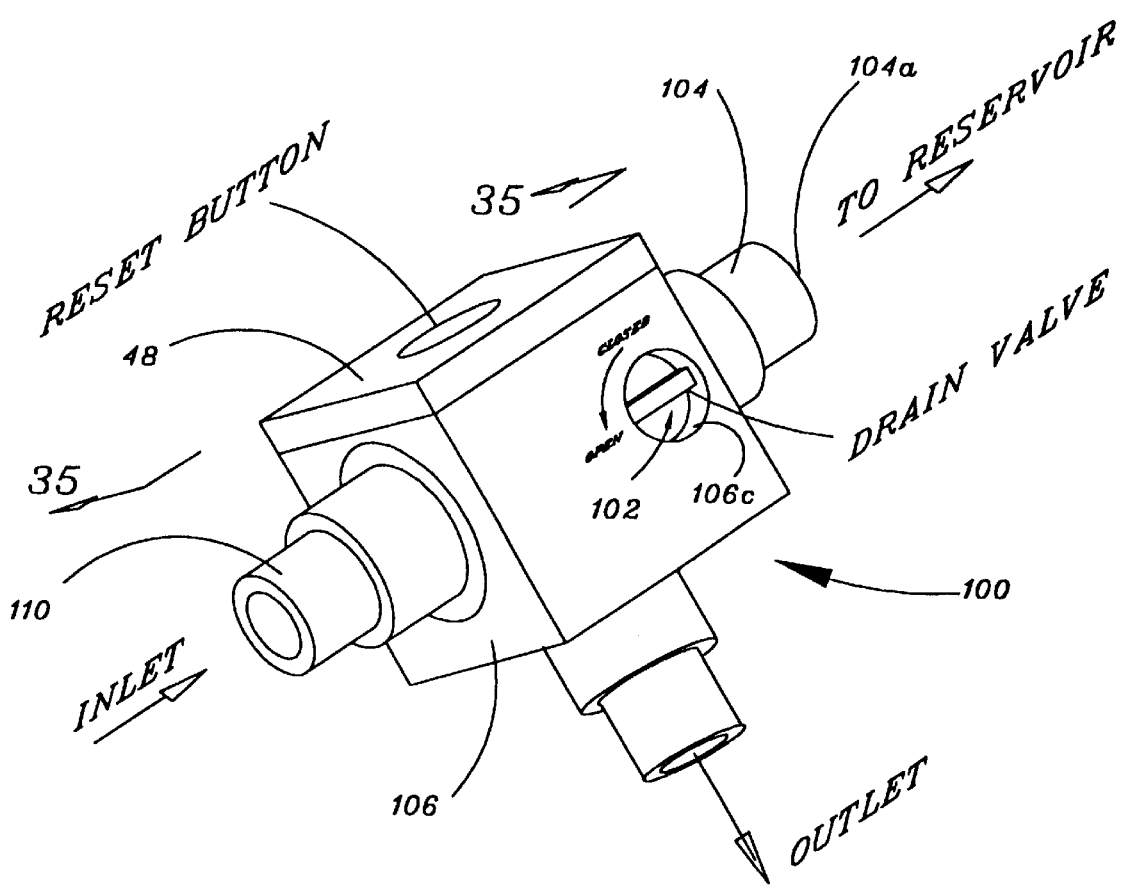
FIG. 33 is a perspective view of the third embodiment of the relief valve of this invention.
Figure 34:
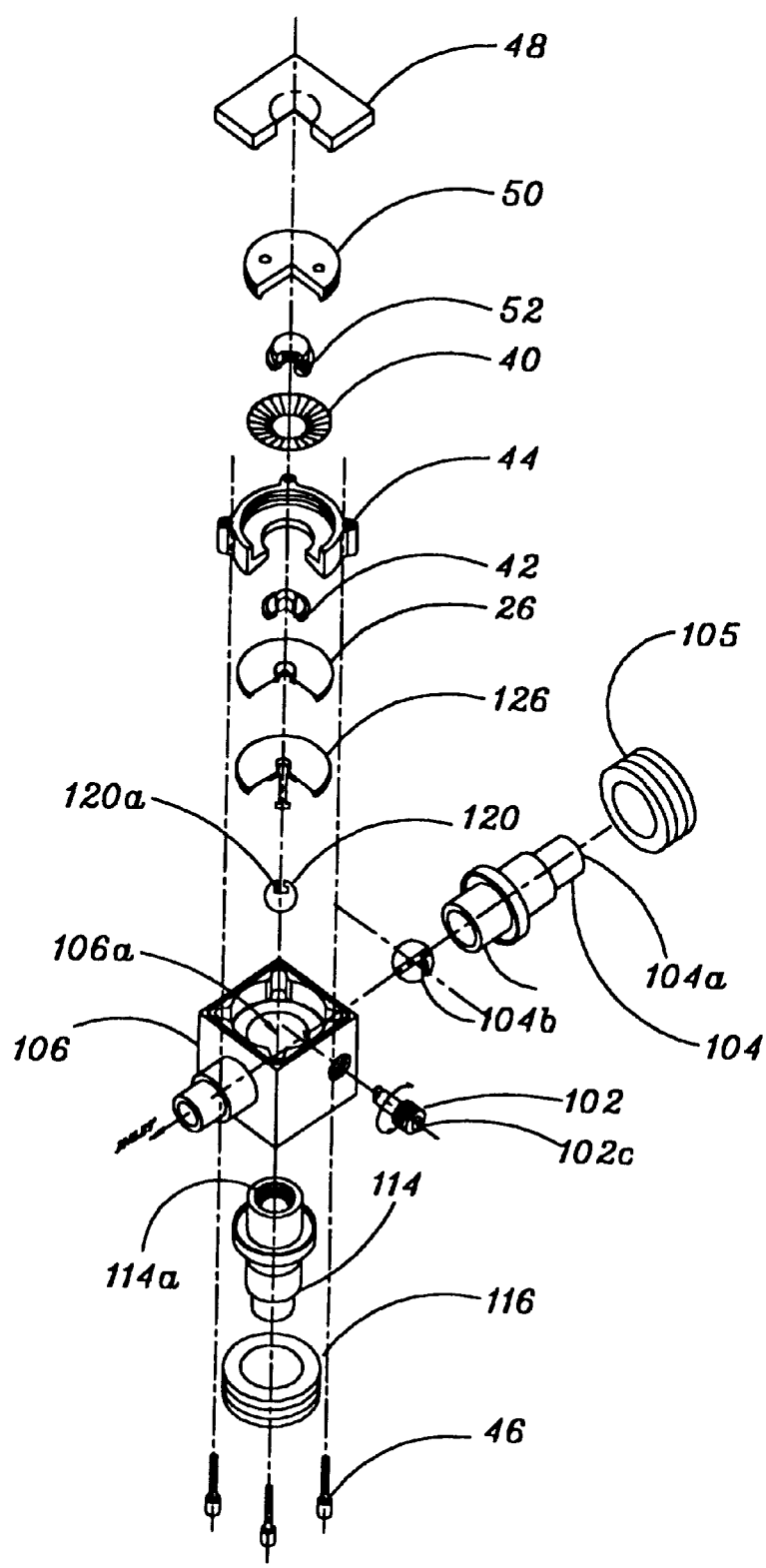
FIG. 34 is an exploded perspective view of the relief valve shown in FIG. 33.

When the pressure of the fluid entering the inlet 68 exceeds a predetermined level, the disc spring 40 inverts and moves into the position as shown in FIG. 32, causing the plug 14 to be removed from the port 64 to allow fluid to flow through the port and out the outlet 72. The user then manually pushes against the exterior of the cover 48 to depress the button 52 to return the disc spring 40 to its original position shown in FIG. 31.

Third Embodiment

As illustrated in FIGS. 33–37, the third embodiment of this invention, the valve 100, is similar to the second embodiment, the valve 60, except the third embodiment, has a drain valve 102 and drain outlet 104.

Figure 35:
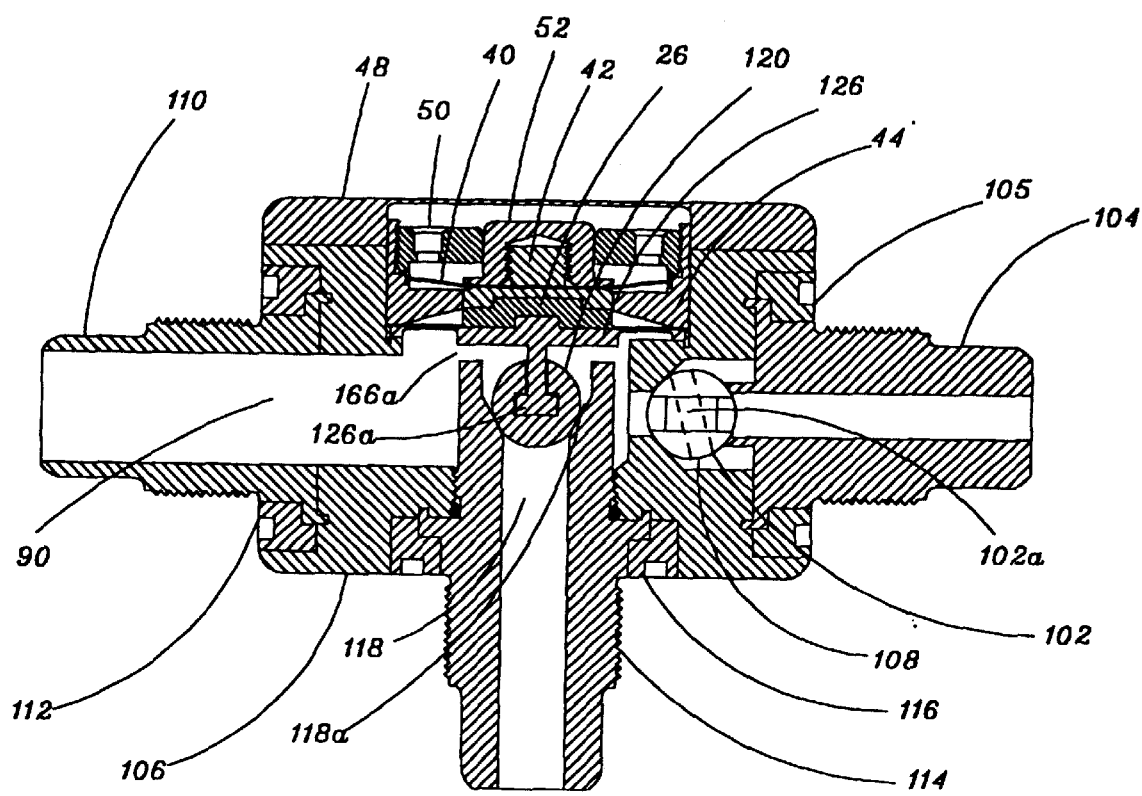
FIG. 35 is a cross-sectional view taken along line 35—35 of FIG. 33 showing the valve in a closed position.
Figure 36:
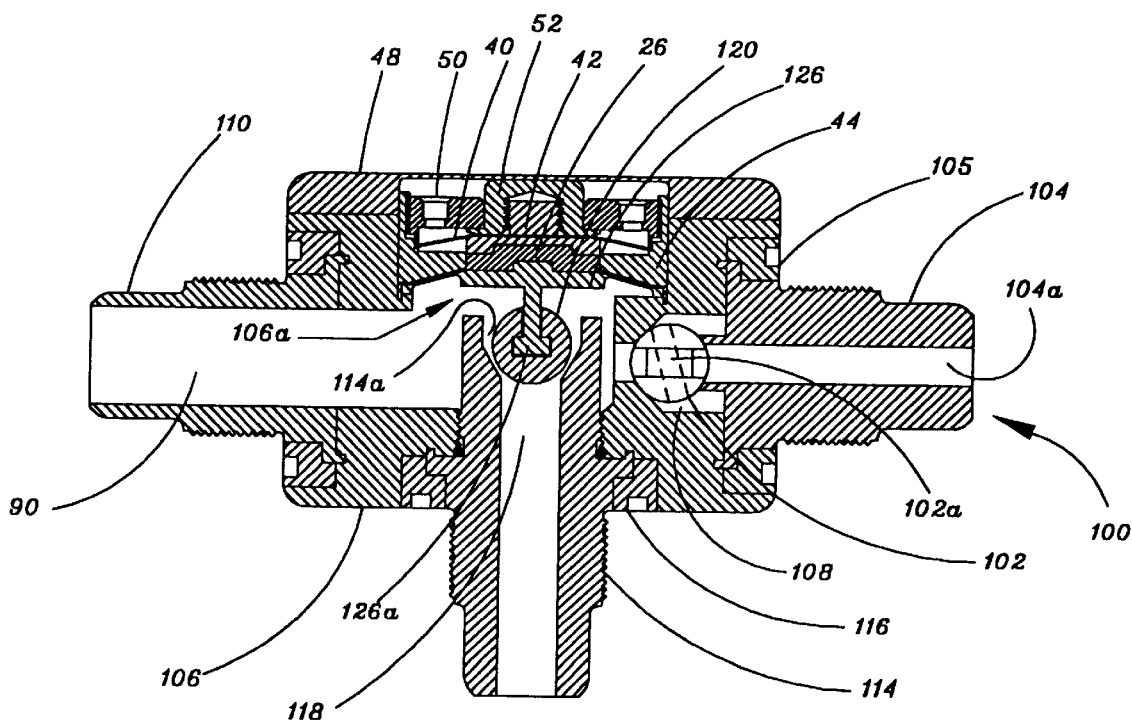
FIG. 36 is a cross-sectional view similar to that shown in FIG. 35 with the valve in the open position.

The valve 100 includes a body member 106 essentially identical to the body member of the valve 60 except it is configured to house the drain valve 102. This drain valve 102 is located in a passageway 108 in the body member 106 and this passageway 108 is in communication with the drain outlet 104. A lock nut 105 connects the drain outlet 104 to the body member 106. When the drain valve 102 is in the position shown in solid lines in FIGS. 35 and 36, it is closed to prevent fluid from escaping through the drain outlet 104. When the drain valve 102 is in the position shown in dotted lines in FIGS. 35 and 36, it is opened to allow fluid to escape through the drain outlet 104. There is an opening 102a in the drain valve 102 that is oriented in a vertical position as shown in FIGS. 35 and 36 when the drain valve 102 is in the open position shown in dotted lines, allowing fluid to flow through the opening 102a and out the drain outlet 104. The outlet end 104a of the drain outlet 104, for example, may be in communication with a reservoir of the fluid, so that with the drain valve 102 open fluid flows through the valve 100 into the reservoir.

A tubular inlet 110 is connected to one side of the body member 106 by a lock nut 112 and a tubular outlet 114 is connected by a lock nut 116 to the underside of the body member. In this embodiment, a port 118, which has tapered side walls 118a, is the inner end 114a of the tubular outlet 114. The inner end 114a extends into a cavity 106a within the body member 106. The cavity 106a and the port 118 are part of a passageway 122 extending between the inlet 110 and outlet 114.

Figure 37:
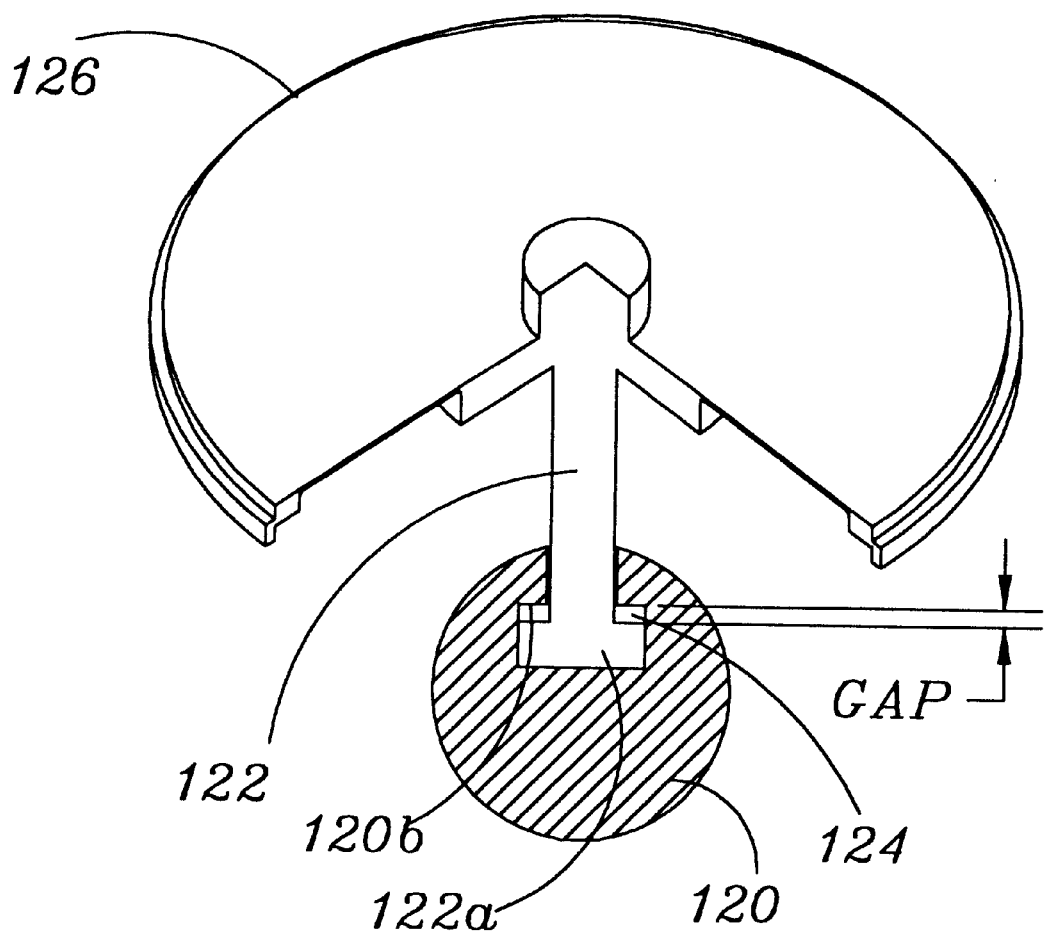
FIG. 37 is an enlarged, fragmentary perspective view of the inner diaphragm used in the third embodiment.
Figure 38:
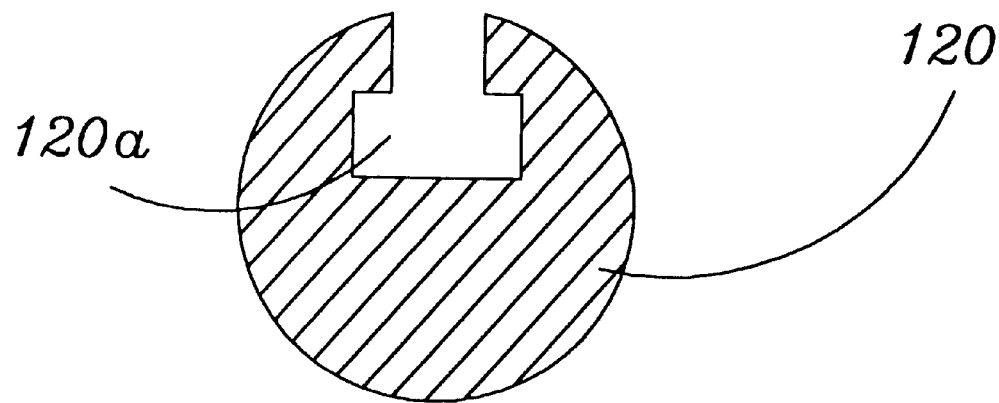
FIG. 38 is a perspective view of the inner diaphragm connected to a ball plug.

As best shown in FIG. 37, a ball-type plug 120 is employed to close off the port 118. There is an open T-slot 120a in the ball-type plug 120. The plug 120 is connected to the pair of inner and outer diaphragms 24 and 26, respectively, which are connected together and attached to the body member 106 in essentially the same way as discussed above in connection with the first and second embodiments. The principal difference between the third embodiment and the first and second embodiments is the drain valve 102, the drain outlet 104, and the plug 120. The inner diaphragm 24 has a T-shaped member 122 connected to and extending outward from its underside. This T-shaped member 122 has a cross member 122a fitting within the slot 120a in the ball 120. There is a slight gap 124 between the cross member 122a and the upper side 120b of the slot 120a. The purpose of this gap is to allow some slight movement of the T-shaped member 122 in the opposite direction of the sealing ball 120 prior to the lift off point of the spring 40. This will allow the ball 120 to stay under sealing pressure of the fluid until the force or pressure balance between the load on the spring 40 and the force of the fluid pressure acting of the plug 14 is reached.

As shown in FIG. 35, the ball 120 is seated in the inner end 114a of the tubular outlet 114, preventing fluid to flow between the inlet 110 and outlet when the disc spring 40 is in the position shown in this FIG. 35. A user could manually turn the drain valve 102 by gripping the manually operable dial 102c (FIG. 34) which extends through an opening 106c (FIG. 33) in the side of the body member 106. When the drain valve 102 is manually turned so that it is moved to the position shown in dotted lines, the opening 102a in the valve provides communication between the inlet 110 and the drain outlet 104 so that fluid may flow directly through the valve 102 and out the drain outlet to the reservoir.

When the drain outlet 104 is closed as shown in FIGS. 35 and 36 and the pressured of the fluid in the passageway 122 exceeds a pre-determined limit, the disc spring 40 moves to the inverted position shown in FIG. 36. This causes the inner diaphragm 24 to move away from the port 118, removing the ball 120 from the port to allow fluid to flow from the inlet 110 through the passageway 90 of the inlet 110 and out the port 118 of the outlet 114. The user, by manually depressing the cover 48, returns the disc spring 40 to the position shown in FIG. 35, moving the ball 120 again into the port 118 to close this port and prevent fluid from flowing through the valve 100.

Although the above embodiments depict the disk spring 40 moving between inverted positions, requiring the user to manually depress the cover 48 to return the spring to its initially closed position, this is not needed in all configurations of this invention. It is possible to design the disk spring 40 so that at a pre-determined pressure it will bend sufficiently to open the valve, but once this pre-determined pressure is removed the spring will automatically return to its normally closed position. Thus, there would be no requirement that the user manually force the disk spring into the closed position.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A valve that controls the flow of a corrosive fluid and responds to a pre-determined pressure of said fluid flowing into the valve, including
    a body member having a passageway with an inlet and an outlet, said passageway having an internal surface made of a fluorocarbon polymer,
    a port along the passageway between the inlet and the outlet,
    a plug having a first position where said plug is seated in the port to close the valve and an second position where said plug is withdrawn from the port to open the valve, said plug comprising a pair of stacked together flexible diaphragms, one diaphragm having a surface in contact with the fluid, said surface being made of a fluorocarbon polymer, and
    a disc spring engaging the plug, said disc spring having a first position holding the plug in the port when the pressure of the fluid is below said pre-determined pressure and a second position withdrawing the plug from the port when the pressure of the fluid exceeds said pre-determined pressure.

2. The valve of claim 1 where the disc spring has a shape that is a segment of a cone.

3. The valve of claim 1 including a reset member that is manually activated to position the disc spring in the first position to insert the plug in the port.

4. The valve of claim 1 including a drain outlet with a manually controllable valve that has an open position allowing fluid to flow out the drain outlet and a closed position preventing fluid from exiting the valve through the drain outlet.

5. The valve of claim 1 where the plug includes a ball member that is seated in the port when the plug is in the first position.

6. The valve of claim 5 where the ball member has a gap therein that allows the plug to remain in a sealing position until the spring disc is ready to change positions.

7. The valve of claim 1 where both diaphragms are made of a fluorocarbon polymer.

8. A valve that controls the flow of a corrosive fluid and responds to a pre-determined pressure of said fluid flowing into the valve, including a body member having a passageway with an inlet and an outlet, said passageway having an internal surface made of a fluorocarbon polymer, a port along the passageway between the inlet and the outlet, a plug having a first position where said plug is seated in the port to close the valve and an second position where said plug is withdrawn from the port to open the valve, said plug comprising a flexible diaphragm made of a fluorocarbon polymer and including a thin peripheral membrane with an outer edge that terminates in a lip, a pair of wall elements between which the lip is seated and held firm thereby, and a disc spring engaging the plug, said disc spring having a first position holding the plug in the port when the pressure of the fluid is below said pre-determined pressure and a second position withdrawing the plug from the port when the pressure of the fluid exceeds said pre-determined pressure.

9. The valve of claim 8 where the disc spring has a shape that is a segment of a cone.

10. The valve of claim 8 including a reset member that is manually activated to position the disc spring in the first position to insert the plug in the port.

11. The valve of claim 8 including a drain outlet with a manually controllable valve that has an open position allowing fluid to flow out the drain outlet and a closed position preventing fluid from exiting the valve through the drain outlet.

12. The valve of claim 10 where the plug includes a ball member that is seated in the port when the plug is in the first position.

13. The valve of claim 11 where the ball member has a gap therein that allows the plug to remain in a sealing position until the spring disc is ready to change positions.

14. A valve that controls the flow of a corrosive fluid and responds to a pre-determined pressure of said fluid flowing into the valve, including a body member having a passageway with an inlet and an outlet, said passageway having an internal surface made of a fluorocarbon polymer, a port along the passageway between the inlet and the outlet, a plug that includes a ball member, said plug having a first position where said ball member is seated in the port to close the valve and a n second position where said ball member is withdrawn from the port to open the valve, said plug including a pair of stacked together, flexible diaphragms, each diaphragm including a thin peripheral membrane with outer edge that terminates in a lip, both diaphragms being made of a fluorocarbon polymer, said ball member extending from one diaphragm to engage the port, a pair of wall elements between which the lips of the pair of stacked together diaphragms are seated and held firm thereby, a disc spring having a shape that is a segment of a cone with an outer edge, said disc spring engaging the plug and having a first position holding the plug in the port when the pressure of the fluid is below said pre-determined pressure and a second position withdrawing the plug from the port when the pressure of the fluid exceeds said pre-determined pressure, a retainer housing for the disc spring that includes a tapered portion engaging the outer edge of the disc spring, and a drain outlet with a manually controllable valve that has an open position allowing fluid to flow out the drain outlet and a closed position preventing fluid from exiting the valve through the drain outlet.

15. The valve of claim 14 including a reset member that is manually activated to position the disc spring in the first position to insert the sealing element in the port.

16. The valve of claim 14 where the ball member has a gap therein that allows the plug to remain in a sealing position until the spring disc is ready to change positions.

* * * * *